(12) United States Patent
Ottoni et al.

(10) Patent No.: US 9,952,864 B2
(45) Date of Patent: Apr. 24, 2018

(54) SYSTEM, APPARATUS, AND METHOD FOR SUPPORTING CONDITION CODES

(75) Inventors: Guilherme D. Ottoni, Campbell, CA (US); Hong Wang, Santa Clara, CA (US); Christopher T. Weaver, Austin, TX (US); Thomas A. Hartin, Austin, TX (US); Wei Li, Santa Clara, CA (US); Jason W. Brandt, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 1421 days.

(21) Appl. No.: 12/646,762

(22) Filed: Dec. 23, 2009

(65) Prior Publication Data

US 2011/0153990 A1 Jun. 23, 2011

(51) Int. Cl.
*G06F 9/30* (2006.01)

(52) U.S. Cl.
CPC ...... *G06F 9/30058* (2013.01); *G06F 9/30094* (2013.01); *G06F 9/30116* (2013.01)

(58) Field of Classification Search
CPC .......................... G06F 9/30094; G06F 9/30116
USPC ............................................................ 712/7
See application file for complete search history.

(56) References Cited

U.S. PATENT DOCUMENTS

| | | | |
|---|---|---|---|
| 5,193,157 A * | 3/1993 | Barbour et al. | 712/234 |
| 6,629,235 B1 * | 9/2003 | Flachs | G06F 9/30094 712/219 |
| 6,862,664 B2 * | 3/2005 | Tremblay et al. | 711/137 |
| 8,069,339 B2 * | 11/2011 | Henry et al. | 712/235 |
| 2003/0182538 A1 * | 9/2003 | Gold et al. | 712/217 |
| 2004/0064683 A1 * | 4/2004 | Kalluri et al. | 712/226 |

OTHER PUBLICATIONS

David L. Weaver and Tom Germond. "The SPARC Architecture Manual" SPARC International, Inc. Version 9; SA-V09-R147—Jul. 2003.*
SPARC V7.0, Rev.A; Temic Semiconductors; Oct. 9, 1996; 136 pages.

* cited by examiner

*Primary Examiner* — Jacob A Petranek
(74) *Attorney, Agent, or Firm* — Nicholson De Vos Webster & Elliott, LLP

(57) ABSTRACT

An apparatus is described having decode circuitry to decode a first instruction, wherein the first instruction indicates that a copy of a plurality of condition codes bits is to be copied from a first register to a second register. The apparatus also has first execution circuitry to copy a plurality of condition code bits from a first register to a second register.

17 Claims, 32 Drawing Sheets

---

RECEIVE A SAVESCC INSTRUCTION
<u>401</u>

↓

EXECUTE SAVESCC TO COPY CONDITION CODES OF CONDITION CODE REGISTER TO A SHADOW REGISTER <u>403</u>

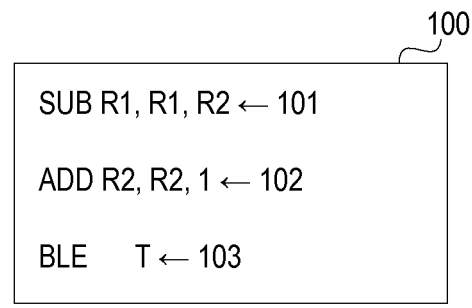
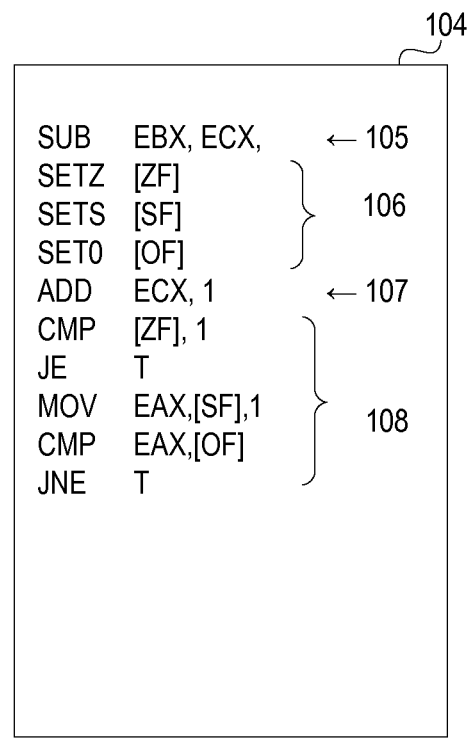
FIG. 1
(PRIOR ART)

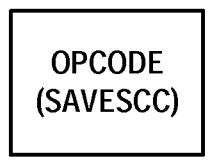
301
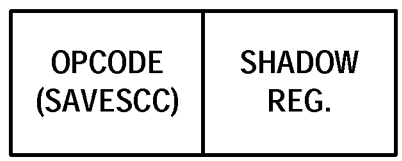
303
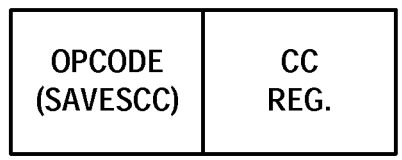
305
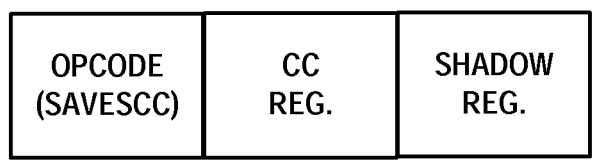
307
FIG. 3

| INSTRUCTION | DESCRIPTION |
| --- | --- |
| JA.SCC REL8 | JUMP SHORT IF ABOVE (CF=0 AND ZF=0). |
| JAE.SCC REL8 | JUMP SHORT IF ABOVE OR EQUAL (CF=0). |
| JB.SCC REL8 | JUMP SHORT IF BELOW (CF=1). |
| JBE.SCC REL8 | JUMP SORT IF BELOW OR EQUAL (CF=1 OR ZF=1). |
| JCR.SCC REL8 | JUMP SHORT IF CARRY |
| JE.SCC REL8 | JUMP SHORT IF EQUAL (ZF=1). |
| JG.SCC REL8 | JUMP SHORT IF GREATER (ZF=0 AND SF=OF). |
| JGE.SCC REL8 | JUMP SHORT IF GREATER OR EQUAL (SF=OF). |
| JL.SCC REL8 | JUMP SHORT IF LESS (SF≠ OF). |
| JLE.SCC REL8 | JUMP SHORT IF LESS OR EQUAL (ZF=1 OR SF≠OF). |
| JNA.SCC REL8 | JUMP SHORT IF NOT ABOVE (CF=1 OR ZF=1). |
| JNAE.SCC REL8 | JUMP SHORT IF NOT ABOVE OR EQUAL (CF=1). |
| JNB.SCC REL8 | JUMP SHORT IF NOT BELOW (CF=0). |
| JNBE.SCC REL8 | JUMP SHORT IF NOT BELOW OR EQUAL (CF=0 AND ZF=0). |
| JNC.SCC REL8 | JUMP SHORT IF NOT CARRY (CF=0). |
| JNE.SCC REL8 | JUMP SHORT IF NOT EQUAL (ZF=0). |
| JNG.SCC REL8 | JUMP SHORT IF NOT GREATER (ZF=1 OR SF≠OF). |
| JNGE.SCC REL8 | JUMP SHORT IF NOT GREATER OR EQUAL (SF≠OF). |
| JNL.SCC REL8 | JUMP SHORT IF NOT GREATER OR EQUAL (SF=OF). |
| JNLE.SCC REL8 | JUMP SHORT IF NOT LESS OR EQUAL (ZF=0 AND SF=OF). |
| JNO.SCC REL8 | JUMP SHORT IF NOT OVERFLOW (OF=0). |
| JNP.SCC REL8 | JUMP SHORT IF NOT PARITY (PF=0). |
| JNS.SCC REL8 | JUMP SHORT IF NOT SIGN (SF=0). |
| JNZ.SCC REL8 | JUMP SHORT IF NOT ZERO (ZF=0). |
| JO.SCC REL8 | JUMP SHORT IF NO OVERFLOW (OF=1). |
| JP.SCC REL8 | JUMP SHORT IF PARITY (PF=1). |
| JPE.SCC REL8 | JUMP SORT IF PARITY EVEN (PF=1). |
| JPO.SCC REL8 | JUMP SHORT IF PARITY ODD (PF=0). |
| JS.SCC REL8 | JUMP SHORT IF SIGN (SF=1). |
| JZ.SCC REL8 | JUMP SHORT IF ZERO (ZF ← 1). |
| JA.SCC REL16 | JUMP NEAR IF ABOVE (CF=0 AND ZF=0). |
| JA.SCC REL32 | JUMP NEAR IF ABOVE (CF=0 AND ZF=0).). |
| JAE.SCC REL16 | JUMP NEAR IF ABOVE OR EQUAL (CF=0). |
| JAE.SCC REL32 | JUMP NEAR IF ABOVE OR EQUAL (CF=0). |

FIG. 6A

| INSTRUCTION | DESCRIPTION |
| --- | --- |
| JNZ.SCC REL8 | JUMP SHORT IF NOT ZERO (ZF=0). |
| JO.SCC REL8 | JUMP SHORT IF NO OVERFLOW (OF=1). |
| JP.SCC REL8 | JUMP SHORT IF PARITY (PF=1). |
| JPE.SCC REL8 | JUMP SORT IF PARITY EVEN (PF=1). |
| JPO.SCC REL8 | JUMP SHORT IF PARITY ODD (PF=0). |
| JS.SCC REL8 | JUMP SHORT IF SIGN (SF=1). |
| JZ.SCC REL8 | JUMP SHORT IF ZERO (ZF $\leftarrow$ 1). |
| JA.SCC REL16 | JUMP NEAR IF ABOVE (CF=0 AND ZF=0). |
| JA.SCC REL32 | JUMP NEAR IF ABOVE (CF=0 AND ZF=0).). |
| JAE.SCC REL16 | JUMP NEAR IF ABOVE OR EQUAL (CF=0). |
| JAE.SCC REL32 | JUMP NEAR IF ABOVE OR EQUAL (CF=0). |
| JB.SCC REL16 | JUMP NEAR IF BELOW (CF=1). |
| JB.SCC REL32 | JUMP NEAR IF BELOW (CF=1). |
| JBE.SCC REL16 | JUMP NEAR IF BELOW OR EQUAL (CF=1 OR ZF=1). |
| JBE.SCC REL32 | JUMP NEAR IF BELOW OR EQUAL (CF=1 OR ZF=1). |
| JC.SCC REL16 | JUMP NEAR IF CARRY (CF=1). |
| JC.SCC REL32 | JUMP NEAR IF CARRY (CF=1). |
| JE.SCC REL16 | JUMP NEAR IF EQUAL (ZF=1). |
| JE.SCC REL32 | JUMP NEAR IF EQUAL (ZF=1). |
| JZ.SCC REL16 | JUMP NEAR IF 0 (ZF=1). |
| JZ.SCC REL32 | JUMP NEAR IF 0 (ZF=1). |
| JG.SCC REL16 | JUMP NEAR IF GREATER (ZF=0 AND SF=OF). |
| JG.SCC REL32 | JUMP NEAR IF GREATER (ZF=0 AND SF=OF). |
| JGE.SCC REL16 | JUMP NEAR IF GREATER OR EQUAL (SF=OF). |
| JGE.SCC REL32 | JUMP NEAR IF GREATER OR EQUAL (SF=OF). |
| JL.SCC REL16 | JUMP NEAR IF LESS (SF$\neq$OF). |
| JL.SCC REL32 | JUMP NEAR IF LESS (SF$\neq$OF). |
| JLE.SCC REL16 | JUMP NEAR IF LESS OR EQUAL TO (ZF=1 OR SF$\neq$OF). |
| JLE.SCC REL32 | JUMP NEAR IF LESS OR EQUAL (ZF=1 OR SF$\neq$OF). |
| JNA.SCC REL16 | JUMP NEAR IF NOT ABOVE (CF=1 OR ZF=1). |
| JNA.SCC REL32 | JUMP NEAR IF NOT ABOVE (CF=1 OR ZF=1). |
| JNAE.SCC REL16 | JUMP NEAR IF NOT ABOVE OR EQUAL (CF=1). |
| JNAE.SCC REL32 | JUMP NEAR IF NOT ABOVE OR EQUAL (CF=1). |
| JNB.SCC REL16 | JUMP NEAR IF NOT BELOW (CF=0). |
| JNB.SCC REL32 | JUMP NEAR IF NOT BELOW (CF=0). |
| JNBE.SCC REL16 | JUMP NEAR IF NOT BELOW OR EQUAL (CF=0 AND ZF=0). |
| JNBE.SCC REL32 | JUMP NEAR IF NOT BELOW OR EQUAL (CF=0 AND ZF=0). |

FIG. 6B

| INSTRUCTION | DESCRIPTION |
| --- | --- |
| JNC.SCC REL16 | JUMP NEAR IF NOT CARRY (CF=0). |
| JNC.SCC REL32 | JUMP NEAR IF NOT CARRY (CF=0). |
| JNE.SCC REL16 | JUMP NEAR IF NOT EQUAL (ZF=0). |
| JNE.SCC REL32 | JUMP NEAR IF NOT EQUAL (ZF=0). |
| JNG.SCC REL16 | JUMP NEAR IF NOT GREATER (ZF=1 OR SF≠OF). |
| JNG.SCC REL32 | JUMP NEAR IF NOT GREATER (ZF=1 OR SF≠OF). |
| JNGE.SCC REL16 | JUMP NEAR IF NOT GREATER OR EQUAL (SF≠OF). |
| JNGE.SCC REL32 | JUMP NEAR IF NOT GREATER OR EQUAL (SF≠OF). |
| JNL.SCC REL16 | JUMP NEAR IF NOT LESS (SF≠OF) |
| JNL.SCC REL32 | JUMP NEAR IF NOT LESS (SF≠OF) |
| JNLE.SCC REL16 | JUMP NEAR IF NOT LESS OR EQUAL (ZF=0 AND SF=OF). |
| JNLE.SCC REL32 | JUMP NEAR IF NOT LESS OR EQUAL (ZF=0 AND SF=OF). |
| JNO.SCC REL16 | JUMP NEAR IF NOT OVERFLOW (OF=0). |
| JNO.SCC REL32 | JUMP NEAR IF NOT OVERFLOW (OF=0). |
| JNP.SCC REL16 | JUMP NEAR IF NOT PARITY (PF=0). |
| JNP.SCC REL32 | JUMP NEAR IF NOT PARITY (PF=0). |
| JNS.SCC REL16 | JUMP NEAR IF NOT SIGN (SF=0). |
| JNS.SCC REL32 | JUMP NEAR IF NOT SIGN (SF=0). |
| JNZ.SCC REL16 | JUMP NEAR IF NOT ZERO (ZF=0). |
| JNZ.SCC REL32 | JUMP NEAR IF NOT ZERO (ZF=0). |
| JO.SCC REL16 | JUMP NEAR IF OVERFLOW (OF=1). |
| JO.SCC REL32 | JUMP NEAR IF OVERFLOW (OF=1). |
| JP.SCC REL16 | JUMP NEAR IF PARITY (PF=1). |
| JP.SCC REL32 | JUMP NEAR IF PARITY (PF=1). |
| JPE.SCC REL16 | JUMP NEAR IF PARITY EVEN (PF=1). |
| JPE.SCC REL32 | JUMP NEAR IF PARITY EVEN (PF=1). |
| JPO.SCC REL16 | JUMP NEAR IF PARITY ODD (PF=0). |
| JPO.SCC REL32 | JUMP NEAR IF PARITY ODD (PF=0). |
| JS.SCC REL16 | JUMP NEAR IF SIGN (SF=1). |
| JS.SCC REL32 | JUMP NEAR IF SIGN (SF=1). |
| JZ.SCC REL16 | JUMP NEAR IF 0 (ZF=1). |
| JZ.SCC REL32 | JUMP NEAR IF 0 (ZF=1). |

FIG. 6C

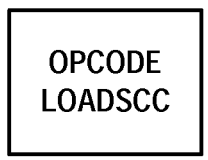 1401
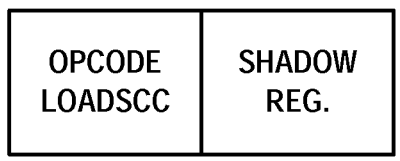 1403
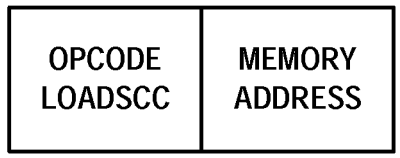 1405
 1407
FIG. 14

1701
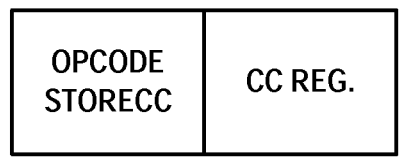
1703
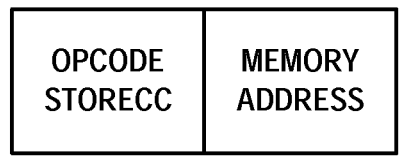
1705
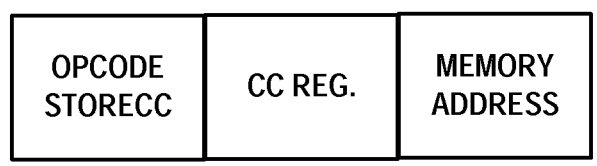
1707
FIG. 17

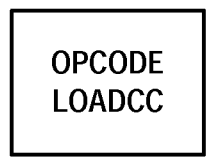 1901
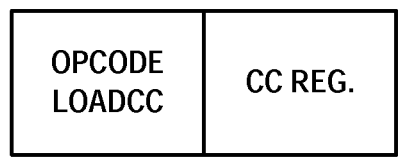 1903
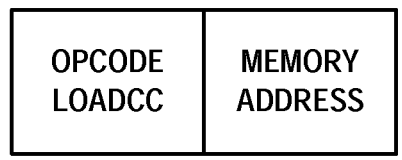 1905
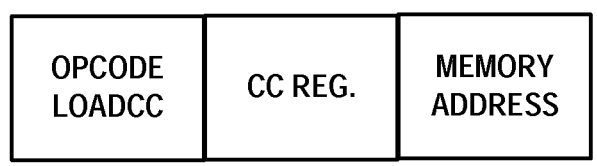 1907
FIG. 19

| INSTRUCTION | DESCRIPTION |
|---|---|
| JA.M M8, REL8 | JUMP SHORT IF ABOVE (CF=0 AND ZF=0). |
| JAE.M M8, REL8 | JUMP SHORT IF ABOVE OR EQUAL (CF=0). |
| JB.M M8, REL8 | JUMP SHORT IF BELOW (CF=1). |
| JBE.M M8, REL8 | JUMP SORT IF BELOW OR EQUAL (CF=1 OR ZF=1). |
| JCR.M M8, REL8 | JUMP SHORT IF CARRY |
| JE.M M8, REL8 | JUMP SHORT IF EQUAL (ZF=1). |
| JG.M M8, REL8 | JUMP SHORT IF GREATER (ZF=0 AND SF=OF). |
| JGE.M M8, REL8 | JUMP SHORT IF GREATER OR EQUAL (SF=OF). |
| JL.M M8, REL8 | JUMP SHORT IF LESS (SF≠ OF). |
| JLE.M M8, REL8 | JUMP SHORT IF LESS OR EQUAL (ZF=1 OR SF≠OF). |
| JNA.M M8, REL8 | JUMP SHORT IF NOT ABOVE (CF=1 OR ZF=1). |
| JNAE.M M8, REL8 | JUMP SHORT IF NOT ABOVE OR EQUAL (CF=1). |
| JNB.M M8, REL8 | JUMP SHORT IF NOT BELOW (CF=0). |
| JNBE.M M8, REL8 | JUMP SHORT IF NOT BELOW OR EQUAL (CF=0 AND ZF=0). |
| JNC.M M8, REL8 | JUMP SHORT IF NOT CARRY (CF=0). |
| JNE.M M8, REL8 | JUMP SHORT IF NOT EQUAL (ZF=0). |
| JNG.M M8, REL8 | JUMP SHORT IF NOT GREATER (ZF=1 OR SF≠OF). |
| JNGE.M M8, REL8 | JUMP SHORT IF NOT GREATER OR EQUAL (SF≠OF). |
| JNL.M M8, REL8 | JUMP SHORT IF NOT GREATER OR EQUAL (SF=OF). |
| JNLE.M M8, REL8 | JUMP SHORT IF NOT LESS OR EQUAL (ZF=0 AND SF=OF). |
| JNO.M M8, REL8 | JUMP SHORT IF NOT OVERFLOW (OF=0). |
| JNP.M M8, REL8 | JUMP SHORT IF NOT PARITY (PF=0). |
| JNS.M M8, REL8 | JUMP SHORT IF NOT SIGN (SF=0). |
| JNZ.M M8, REL8 | JUMP SHORT IF NOT ZERO (ZF=0). |
| JO.M M8, REL8 | JUMP SHORT IF NO OVERFLOW (OF=1). |
| JP.M M8, REL8 | JUMP SHORT IF PARITY (PF=1). |
| JPE.M M8, REL8 | JUMP SORT IF PARITY EVEN (PF=1). |
| JPO.M M8, REL8 | JUMP SHORT IF PARITY ODD (PF=0). |
| JS.M M8, REL8 | JUMP SHORT IF SIGN (SF=1). |
| JZ.M M8, REL8 | JUMP SHORT IF ZERO (ZF ← 1). |
| JA.M M8, REL16 | JUMP NEAR IF ABOVE (CF=0 AND ZF=0). |
| JA.M M8, REL32 | JUMP NEAR IF ABOVE (CF=0 AND ZF=0).). |
| JAE.M M8, REL16 | JUMP NEAR IF ABOVE OR EQUAL (CF=0). |
| JAE.M M8, REL32 | JUMP NEAR IF ABOVE OR EQUAL (CF=0). |

FIG. 22A

| INSTRUCTION | DESCRIPTION |
|---|---|
| JNZ.M M8, REL8 | JUMP SHORT IF NOT ZERO (ZF=0). |
| JO.M M8, REL8 | JUMP SHORT IF NO OVERFLOW (OF=1). |
| JP.M M8, REL8 | JUMP SHORT IF PARITY (PF=1). |
| JPE.M M8, REL8 | JUMP SORT IF PARITY EVEN (PF=1). |
| JPO.M M8, REL8 | JUMP SHORT IF PARITY ODD (PF=0). |
| JS.M M8, REL8 | JUMP SHORT IF SIGN (SF=1). |
| JZ.M M8, REL8 | JUMP SHORT IF ZERO (ZF ← 1). |
| JA.M M8, REL16 | JUMP NEAR IF ABOVE (CF=0 AND ZF=0). |
| JA.M M8, REL32 | JUMP NEAR IF ABOVE (CF=0 AND ZF=0).). |
| JAE.M M8, REL16 | JUMP NEAR IF ABOVE OR EQUAL (CF=0). |
| JAE.M M8, REL32 | JUMP NEAR IF ABOVE OR EQUAL (CF=0). |
| JB.M M8, REL16 | JUMP NEAR IF BELOW (CF=1). |
| JB.M M8, REL32 | JUMP NEAR IF BELOW (CF=1). |
| JBE.M M8, REL16 | JUMP NEAR IF BELOW OR EQUAL (CF=1 OR ZF=1). |
| JBE.M M8, REL32 | JUMP NEAR IF BELOW OR EQUAL (CF=1 OR ZF=1). |
| JC.M M8, REL16 | JUMP NEAR IF CARRY (CF=1). |
| JC.M M8, REL32 | JUMP NEAR IF CARRY (CF=1). |
| JE.M M8, REL16 | JUMP NEAR IF EQUAL (ZF=1). |
| JE.M M8, REL32 | JUMP NEAR IF EQUAL (ZF=1). |
| JZ.M M8, REL16 | JUMP NEAR IF 0 (ZF=1). |
| JZ.M M8, REL32 | JUMP NEAR IF 0 (ZF=1). |
| JG.M M8, REL16 | JUMP NEAR IF GREATER (ZF=0 AND SF=OF). |
| JG.M M8, REL32 | JUMP NEAR IF GREATER (ZF=0 AND SF=OF). |
| JGE.M M8, REL16 | JUMP NEAR IF GREATER OR EQUAL (SF=OF). |
| JGE.M M8, REL32 | JUMP NEAR IF GREATER OR EQUAL (SF=OF). |
| JL.M M8, REL16 | JUMP NEAR IF LESS (SF≠OF). |
| JL.M M8, REL32 | JUMP NEAR IF LESS (SF≠OF). |
| JLE.M M8, REL16 | JUMP NEAR IF LESS OR EQUAL TO (ZF=1 OR SF≠OF). |
| JLE.M M8, REL32 | JUMP NEAR IF LESS OR EQUAL (ZF=1 OR SF≠OF). |
| JNA.M M8, REL16 | JUMP NEAR IF NOT ABOVE (CF=1 OR ZF=1). |
| JNA.M M8, REL32 | JUMP NEAR IF NOT ABOVE (CF=1 OR ZF=1). |
| JNAE.M M8, REL16 | JUMP NEAR IF NOT ABOVE OR EQUAL (CF=1). |
| JNAE.M M8, REL32 | JUMP NEAR IF NOT ABOVE OR EQUAL (CF=1). |
| JNB.M M8, REL16 | JUMP NEAR IF NOT BELOW (CF=0). |
| JNB.M M8, REL32 | JUMP NEAR IF NOT BELOW (CF=0). |
| JNBE.M M8, REL16 | JUMP NEAR IF NOT BELOW OR EQUAL (CF=0 AND ZF=0). |
| JNBE.M M8, REL32 | JUMP NEAR IF NOT BELOW OR EQUAL (CF=0 AND ZF=0). |

FIG. 22B

| INSTRUCTION | DESCRIPTION |
| --- | --- |
| JNC.M M8, REL16 | JUMP NEAR IF NOT CARRY (CF=0). |
| JNC.M M8, REL32 | JUMP NEAR IF NOT CARRY (CF=0). |
| JNE.M M8, REL16 | JUMP NEAR IF NOT EQUAL (ZF=0). |
| JNE.M M8, REL32 | JUMP NEAR IF NOT EQUAL (ZF=0). |
| JNG.M M8, REL16 | JUMP NEAR IF NOT GREATER (ZF=1 OR SF≠OF). |
| JNG.M M8, REL32 | JUMP NEAR IF NOT GREATER (ZF=1 OR SF≠OF). |
| JNGE.M M8, REL16 | JUMP NEAR IF NOT GREATER OR EQUAL (SF≠OF). |
| JNGE.M M8, REL32 | JUMP NEAR IF NOT GREATER OR EQUAL (SF≠OF). |
| JNL.M M8, REL16 | JUMP NEAR IF NOT LESS (SF≠OF) |
| JNL.M M8, REL32 | JUMP NEAR IF NOT LESS (SF≠OF) |
| JNLE.M M8, REL16 | JUMP NEAR IF NOT LESS OR EQUAL (ZF=0 AND SF=OF). |
| JNLE.M M8, REL32 | JUMP NEAR IF NOT LESS OR EQUAL (ZF=0 AND SF=OF). |
| JNO.M M8, REL16 | JUMP NEAR IF NOT OVERFLOW (OF=0). |
| JNO.M M8, REL32 | JUMP NEAR IF NOT OVERFLOW (OF=0). |
| JNP.M M8, REL16 | JUMP NEAR IF NOT PARITY (PF=0). |
| JNP.M M8, REL32 | JUMP NEAR IF NOT PARITY (PF=0). |
| JNS.M M8, REL16 | JUMP NEAR IF NOT SIGN (SF=0). |
| JNS.M M8, REL32 | JUMP NEAR IF NOT SIGN (SF=0). |
| JNZ.M M8, REL16 | JUMP NEAR IF NOT ZERO (ZF=0). |
| JNZ.M M8, REL32 | JUMP NEAR IF NOT ZERO (ZF=0). |
| JO.M M8, REL16 | JUMP NEAR IF OVERFLOW (OF=1). |
| JO.M M8, REL32 | JUMP NEAR IF OVERFLOW (OF=1). |
| JP.M M8, REL16 | JUMP NEAR IF PARITY (PF=1). |
| JP.M M8, REL32 | JUMP NEAR IF PARITY (PF=1). |
| JPE.M M8, REL16 | JUMP NEAR IF PARITY EVEN (PF=1). |
| JPE.M M8, REL32 | JUMP NEAR IF PARITY EVEN (PF=1). |
| JPO.M M8, REL16 | JUMP NEAR IF PARITY ODD (PF=0). |
| JPO.M M8, REL32 | JUMP NEAR IF PARITY ODD (PF=0). |
| JS.M M8, REL16 | JUMP NEAR IF SIGN (SF=1). |
| JS.M M8, REL32 | JUMP NEAR IF SIGN (SF=1). |
| JZ.M M8, REL16 | JUMP NEAR IF 0 (ZF=1). |
| JZ.M M8, REL32 | JUMP NEAR IF 0 (ZF=1). |

FIG. 22C

SYSTEM, APPARATUS, AND METHOD FOR SUPPORTING CONDITION CODES

FIELD OF INVENTION

The field of invention relates generally to processor architecture, and, more specifically, to an instruction that copies condition code flag information from a first register to a second register.

BACKGROUND

Processors execute instructions to implement software routines. Software written in a high level source code (e.g., C or $C^{\#}$) can be executed on a processor by first compiling the source code with a compiler that converts high level source code into instructions that are specific to the particular processor that the software is to be executed on. The generated instructions (also referred to as "object code" or "binaries") are subsequently stored in a memory, read from the memory and executed by the processor.

Generally, different processors support different sets of instructions. Thus, if the same high level source code described above is to be executed on another, different processor —typically—a second, different compiler is used to convert the high level source code into object code having constituent instructions that, at least in some respects, are different than the instructions associated with the first processor.

It is often convenient to convert object code for one processor into object code for another processor. For instance, if software is purchased in the form of object code for a first type of processor, the software can be adapted to run on a second different type of processor (that supports a different instruction set than the first processor) by converting the object code into different object code having constituent instructions that are supported by the second processor.

Inefficiencies may arise in the newly created object code, however, because of underlying architectural differences between the two processors.

BRIEF DESCRIPTION OF THE DRAWINGS

The present invention is illustrated by way of example and not limitation in the figures of the accompanying drawings, in which like references indicate similar elements and in which:

FIG. 1 (prior art) shows an ARM object code sequence and an X86 object code sequence;

FIG. 3 illustrates exemplary embodiments of the savescc instruction;

FIG. 6 illustrates some exemplary jcc.scc type instructions;

FIG. 14 illustrates exemplary embodiments of loadscc instructions;

FIG. 17 illustrates exemplary embodiments of storecc instructions;

FIG. 19 illustrates exemplary embodiments of loadcc instructions;

FIGS. 22(*a*), (*b*) and (*c*) illustrate some exemplary jcc.m type instructions;

DETAILED DESCRIPTION

Figure 2:
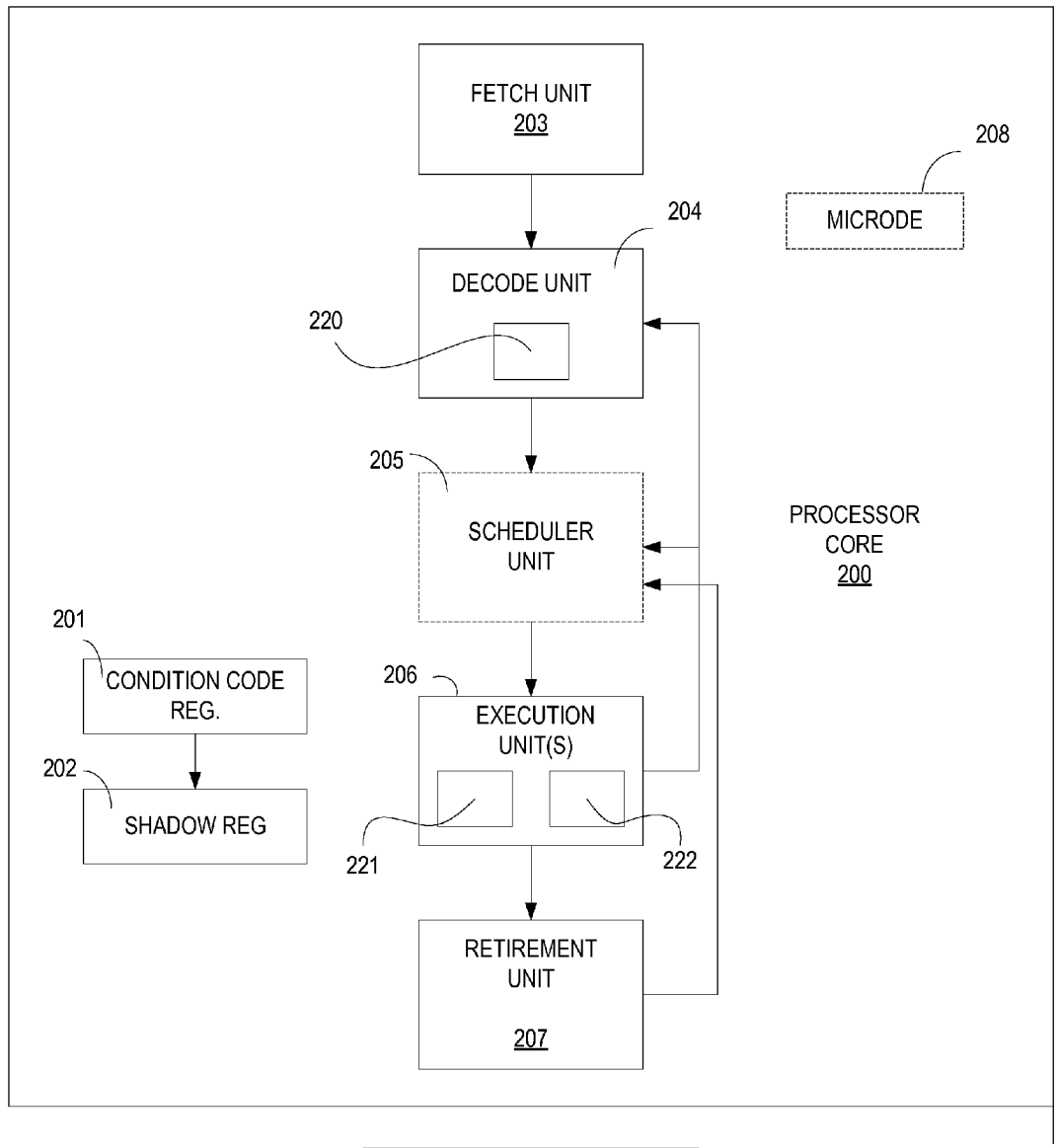
FIG. 2 shows a embodiment of a processor architecture.

Recall that a sequence of instructions for a first processor may not cleanly map to a corresponding sequence of instructions for a second processor because of underlying architectural differences between the two processors.

An example is the conversion of an ARM processor's object code into object code that is targeted for an X86 processor. Here, an ARM processor supports ALU instructions in two flavors: 1) ALU instructions that will change condition code flag information; and, 2) ALU instructions that will not change condition code flag information. By contrast, an X86 processor only supports ALU instructions that will change condition code flag information. Condition code flag information is, typically, a one hot encoded field that describes an arithmetic instruction result. Examples include: zero (ZF), carry (CF), sign (SF), overflow (OF), adjust flag (AF), and parity (PF). As an example, if the execution of an ALU instruction results in a calculated value being equal to zero, a ZF bit is set in condition code flag register space.

Often, jumps in program code are determined by reference to a condition code flag. For example, an instruction sequence may be organized such that the program code jumps to location "X" if the result of an ALU instruction is zero, or, jumps to location "Y" (or performs no jump) if the result of the ALU instruction is not zero. Here, a conditional jump instruction will look to the ZF condition code flag information in order to determine the correct program code direction. Because an ARM processor supports ALU instructions that will change condition code flag information (e.g., "adds" and "subs") as well as ALU instructions that will not change condition code flag information (e.g., "add" and "sub"), an ARM processor can support a sequence of instructions in which a conditional jump instruction refers to condition code flag information that was set by an ALU instruction other than the ALU instruction that immediately preceded the conditional jump instruction.

An example is seen in FIG. 1 which shows an exemplary sequence 100 of ARM processor instructions. Notably, the sequence of instructions includes: 1) a first ALU instruction 101 ("subs") that changes the condition code flag information; 2) a second ALU instruction 102 ("add") that does not change the condition code flag information; and 3) a conditional jump instruction 103 ("ble") that directs program code direction based on the condition code flag information. Notably, because the ARM architecture supports instructions of the type that do not set the condition flag information (such as instruction 102), the ARM architecture cleanly executes a sequence of instructions where an ALU instruction 102 ("add") exists between a conditional jump instruction 103 ("ble") and the ALU instruction 101 ("subs") that sets the condition code flag information that the conditional jump instruction bases its decision on.

Some architectures do not easily support this capability. For example, because all ALU instructions in the X86 architecture can change condition code flag information, a conditional jump instruction that bases its decision on an ALU instruction that is executed earlier than its immediately preceding ALU instruction risks making a jump decision on stale or otherwise incorrect information. As such, a translation of the ARM object code 100 observed in FIG. 1 does not map easily into X86 object code.

FIG. 1 also shows X86 object code 104 that performs the same overall function as the ARM object code 100. That is, code 104 represents as X86 translation of the ARM sequence 100. Notably, significantly more X86 instructions are needed to execute the function. Because the X86 processor does not have any general purpose space register space into which the condition code flag information can be placed, the condition code flag information must be saved to external memory so that it can later be recalled to support execution of the conditional jump. Here, the "setZ [ZF]", "setS [SF]" and "setO [OF]" instructions 106 are instructions that save, to external memory, condition code flag information that reflects any update made by the earlier executed subtraction ALU instruction 105. Here, as is known in the art, external memory accesses are costly because they consume more units of time than accesses to on die register resources.

Once the condition code flag information is safely stored in external memory, the second add ALU instruction 107 is executed, which, as discussed at length above, may change the state of the information in the on die register space that is dedicated to holding condition code flag information (which, in the X86 architecture, is referred to as the EFLAGS register). After execution of the second ALU instruction 107, the externally saved condition code flag information is read back from memory and tested to implement the conditional jump. Instructions 108 implement this sequence of operations. Again, note that a costly external memory access is required.

Thus, when ARM object code is converted to X86 object code, an X86 processor will operate with poor efficiency in code regions where the ARM object code bases a conditional jump on an ALU instruction other correct its immediately preceding ALU instruction.

FIG. 2 shows a processor architecture 200 that should exhibit improved performance over a traditional architecture for object code regions that base a conditional jump on a condition code flag information that was set by an arithmetic instruction other than the conditional jump's immediately preceding arithmetic instruction. In particular, note the existence of a shadow resister 202 in relation to condition code register 201. While in most embodiments the shadow register 202 is a dedicated register, the shadow register 202 may also be general purpose register so long as it is not overwritten before the condition codes it stores are needed.

Here, condition code register 201 corresponds to a register that is the target of an arithmetic instruction (such as an ALU instruction and FPU instruction) that determines and sets condition code flag information. Here, "target" means the storage location of the newly determined condition code flag information. In the context of an X86 register, the EFLAGS register can be viewed as a condition code register. The improved design of FIG. 2 supports a new instruction that, when executed, causes condition code information to be copied from the condition code register 201 to the shadow register 202. Moreover, the improved design of FIG. 2 supports two flavors of conditional jump instructions: 1) conditional jump instructions that look at the condition code register 201; and, 2) conditional jump instructions that look at the shadow resister 202 to make a conditional jump decision. The former flavor of instructions correspond to traditional conditional jump instructions. The latter flavor of instructions are particularly useful, as will be explained further below, for object code sequences in which a conditional jump is based on condition code flag information that was set by an arithmetic instruction other than the conditional jump's immediately preceding arithmetic instruction.

FIG. 2 shows a generic processing core 200 that is believed to describe many different types of processing core architectures such as Complex Instruction Set (CISC), Reduced Instruction Set (RISC) and Very Long Instruction Word (VLIW). The generic processing core 200 of FIG. 2 includes: 1) a fetch unit 203 that fetches instructions (e.g., from cache and/or memory); 2) a decode unit 204 that decodes instructions; 3) a schedule unit 205 that determines the timing and/or order of instruction issuance to the execution units 206 (notably the scheduler is optional); 4) execution units 206 that execute the instructions (typical instruction execution units include branch execution units, integer arithmetic execution units (e.g., ALUs) floating point arithmetic execution units (e.g., FPUs) and memory access execution units); and 5) a retirement unit 207 that signifies successful completion of an instruction. Notably, the processing core 200 may or may not employ microcode 208.

FIG. 2 also shows a snippet of object code 209 that can be used to implement the ARM object code sequence 100 of FIG. 1. First, an arithmetic instruction 210 is executed by one of the execution units 206 that sets condition code flag information in the condition code register 201. A following instruction 211 is executed by one of the execution units 206 that causes condition code flag information in the condition code register 201 to be copied to the shadow register 202. A subsequent arithmetic instruction (savescc) 212 is executed by one of the execution units 206 that sets new condition code flag information in the condition code register 201. Finally, a conditional jump instruction (jcc.scc) 213 is executed by one of the execution units (e.g., a branch execution unit) that looks to the shadow register 202 (rather than the condition code register 201) for the condition code flag information that the conditional jump is based on. Thus, effectively, the conditional jump is based on condition code flag information that was set by an arithmetic instruction (instruction 210) other than the conditional jump instruction's immediately preceding arithmetic instruction (instruction 212). The instruction 211 that copies the condition code flag information into the shadow register 202 and the conditional branch instruction 213 that looks to the shadow register 202 rather than the condition code register 201 essentially provide for proper operation without expensive external memory accesses as observed in the X86 code sequence 104 of FIG. 1.

FIG. 2 also shows logic circuitry within the generic processor core 200 of FIG. 2. A first logic circuitry includes decoder logic circuitry 220 that decodes instructions 211 and 213 (i.e., the copy instruction and the conditional jump instruction). A logic circuitry includes instruction execution logic circuitry 221 that executes the copy instruction (savescc) 211. Here, instruction execution logic circuitry 221 may be coupled to both the condition code register 201 and the shadow register 202 and/or be coupled to logic circuitry between the condition code register 201 and shadow register 202 to control and effect the copy. Instruction execution logic circuitry 221 may be located within any of the various execution units 206 such as an arithmetic execution unit, a memory access execution unit, etc. Additional novel instruction execution logic circuitry includes conditional jump instruction execution logic circuitry 222 that executes the conditional jump instruction 213. In an embodiment, the conditional jump instruction logic circuitry 222 is coupled to the shadow register 202 to read the condition code flag information residing therein. Moreover, the conditional jump instruction logic circuitry 222 may be located in a branch execution unit within the instruction execution units 206. Conceivably, the condition code flag information could be copied to another register from the shadow register 202, and, the conditional jump may be based on a read (by the conditional jump instruction) of the other register. Additional copy instructions may be needed however.

As detailed above, the savescc instruction causes the current condition codes of the condition code register 201 to be copied into the shadow register 201. In some embodiments only the condition codes are copied. In other embodiments, the entire contents of the condition code register 201 are copied. Exemplary embodiments of the savescc instruction is shown in FIG. 3. In FIG. 3, the savescc instruction 301 consists of an opcode and nothing else. In this embodiment the addresses of the condition code register and shadow register are implicit. In other embodiments, the savescc instruction 303 also includes an explicit operand (such as an explicit register or immediate) of the shadow register. In other embodiments, the savescc instruction 305 also includes an explicit operand (such as an explicit register or immediate) of the condition code register. Additionally, in other embodiments, the savescc instruction 307 also includes two explicit operands (such as an explicit register or immediate) of the shadow register and condition code register. Additionally, while the preceding and forthcoming discussion describes that savescc as causing the copying of condition codes from one register into another, in some embodiments the savescc instruction moves the conditions condition codes.

Figure 4:
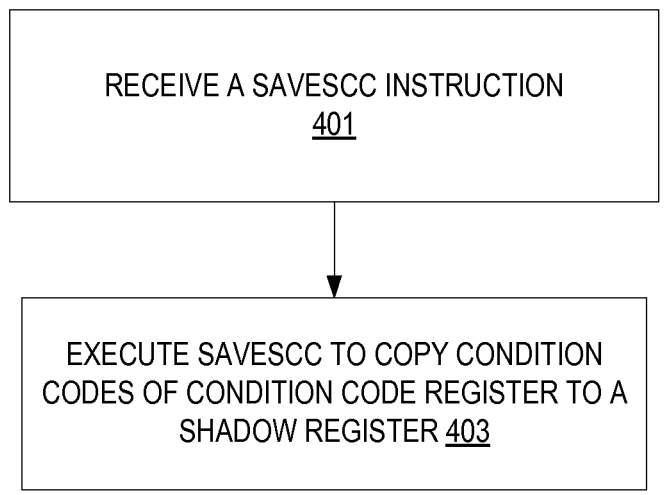
FIG. 4 illustrates an embodiment of a method of operation of the savescc instruction.

FIG. 4 illustrates an embodiment of a method of operation of the savescc instruction. At 401, the savescc instruction is received. In response to the received savescc instruction, it is executed and the condition codes of the condition code register 201 are copied into the shadow register 202 at 403.

Figure 5:
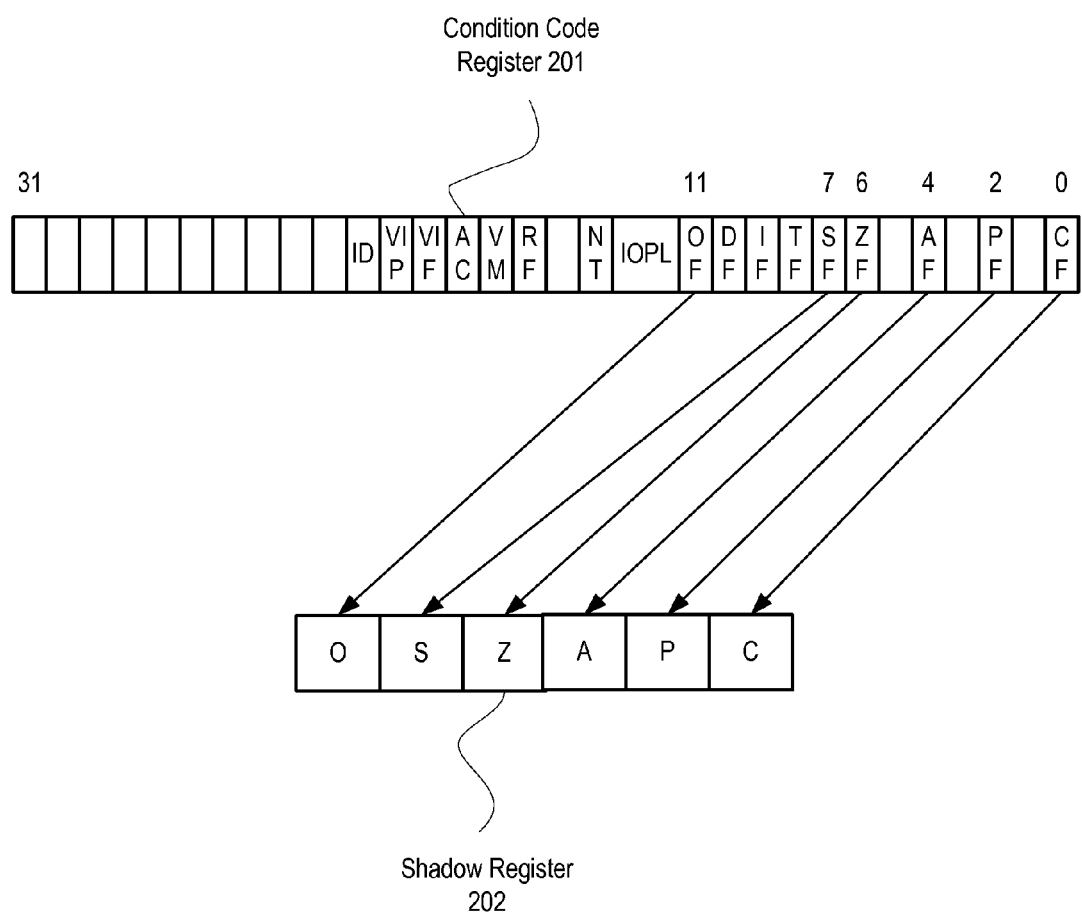
FIG. 5 illustrates an embodiment of the registers of FIG. 2.

FIG. 5 illustrates an embodiment of a condition code register and a shadow register after the execution of a savescc instruction. The condition code register 201 of FIG. 5 is an EFLAGS register and has overflow, sign, zero, parity, adjust, and carry condition code bits at the marked positions. The shadow register 202 receives and stores those condition codes (or at least a portion thereof). While the shadow register 202 shows the arrangement of the condition codes in a particular order, any ordering is acceptable. Additionally, the shadow register can be any size including the five bits shown, eights, 16 bits, etc.

FIG. 6 illustrates some exemplary jcc.scc type instructions. The jcc.scc type instruction conditionally jumps based on one or more values of the shadow register. The execution of this instruction checks the state of one or more of the status flags in the shadow register 202 and, if the flags are in the specified state (condition), performs a jump to the target instruction specified by the destination operand. A condition code (cc) is associated with each instruction to indicate the condition being tested for. If the condition is not satisfied, the jump is not performed and execution continues with the instruction following the jcc.scc instruction.

Each jcc.scc type instruction includes a specified relative offset (a signed offset relative to the current value of the instruction pointer). A relative offset (rel8, rel16, or rel32) is generally specified as a label in assembly code, but at the machine code level, it is encoded as a signed, 8-bit or 32-bit immediate value, which is added to the instruction pointer. The conditions for each jcc.scc mnemonic are given in the "Description" column of FIG. 6. The terms "less" and "greater" are used for comparisons of signed integers and the terms "above" and "below" are used for unsigned integers.

Figure 7:
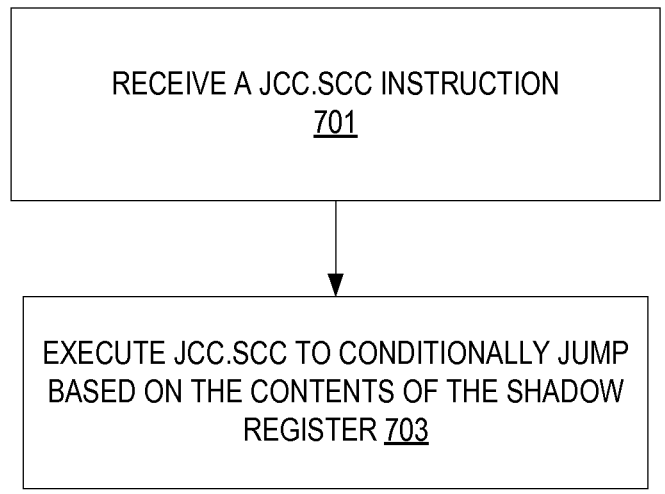
FIG. 7 illustrates an embodiment of a method of operation of a jcc.scc type instruction.

FIG. 7 illustrates an embodiment of a method of operation of a jcc.scc type instruction. At 701, the jcc.scc instruction is received. In response to the received jcc.scc instruction, it is executed and a conditional jump is made based on the condition code of the shadow register indicated by the jcc.scc instruction at 701. If the condition is not valid, then the next instruction is executed.

Figure 8:
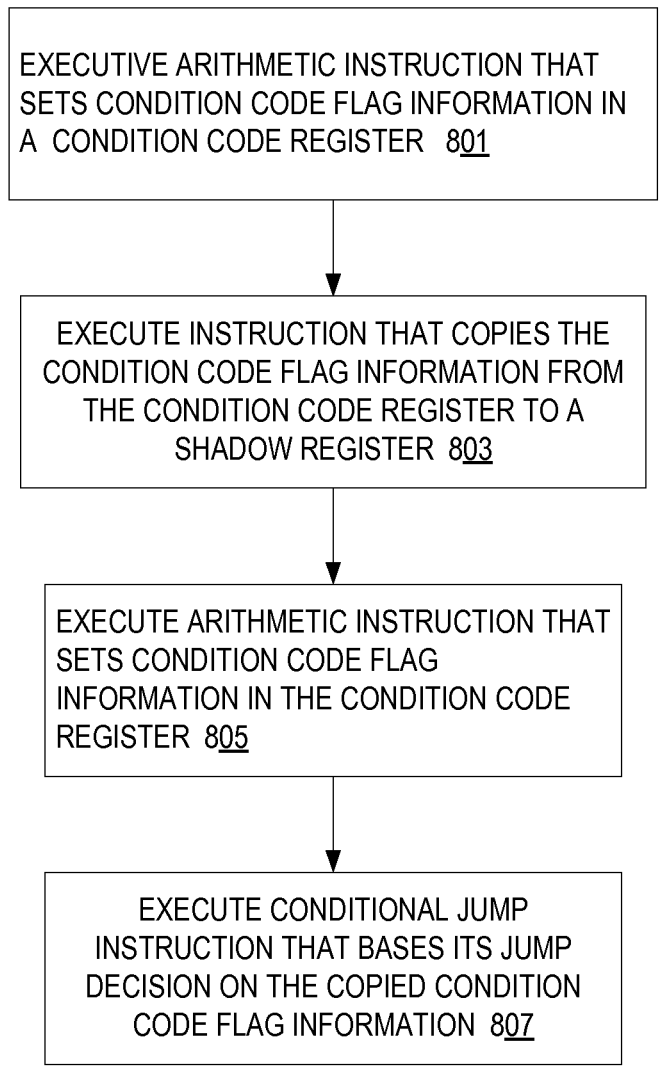
FIG. 8 shows an embodiment of a method that can be performed by the improved processor architecture of FIG. 2.

FIG. 8 provides a flow diagram that describes the operation of the improved processing core of FIG. 2. As observed in the flow diagram of FIG. 8, an arithmetic instruction is executed at 801 that sets condition code flag information in a condition code register. For example, an add instruction is executed. A savescc instruction is executed at 803 that copies condition code flag information from the condition code register to a shadow register. Another arithmetic instruction is executed at 805 that sets condition code flag information in the condition code register. At this point in time, had the savescc instruction not been executed, the condition code information from the first arithmetic instruction would be lost and any instruction that relied on those values would not generate the correct result. Finally, a jcc.scc type instruction is executed at 807 that bases its jump decision on the copied condition code flag information that is stored in the shadow register.

The architecture of FIG. 2 may also support one or more of the following instructions to support saving and/or restoring the condition codes (for example, for context switching): 1) a restorescc instruction to cause the flags from the shadow register 202 to be copied back into the code register 201; 2) a storescc instruction to cause the contents of the shadow register 202 to be copied into a memory address; 3) a loadscc instruction to cause the loading of the shadow register 202 with the contents of a memory address.

Figure 9:
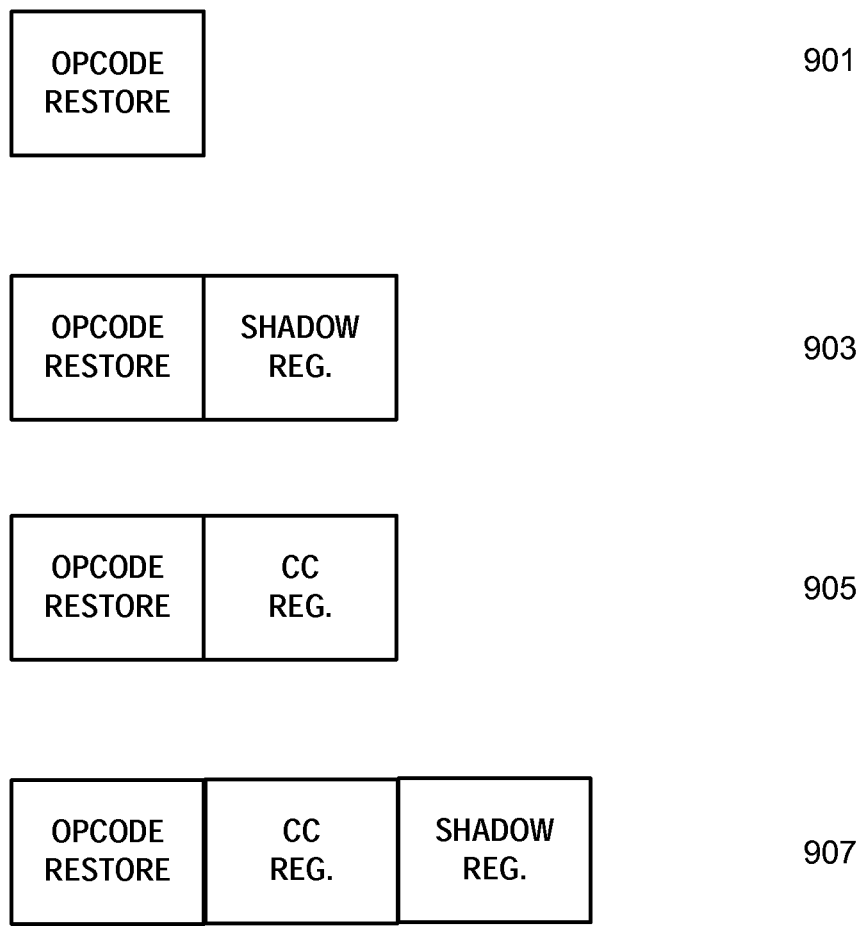
FIG. 9 illustrates exemplary embodiments of restorescc instructions.

Exemplary embodiments of restorescc instructions are shown in FIG. 9. In FIG. 9, the restorescc instruction 901 consists of an opcode and nothing else. In this embodiment the condition code register and shadow register are implicit. In other embodiments, the restorescc instruction 903 also includes an explicit operand (such as an explicit register or immediate) of the shadow register. In other embodiments, the restorescc instruction 905 also includes an explicit operand (such as an explicit register or immediate) of the condition code register. Additionally, in other embodiments, the restorescc instruction 907 also includes two explicit operands (such as an explicit register or immediate) of the shadow register and condition code register. Additionally, while the preceding and forthcoming discussion describes that restorescc as causing the copying of condition codes from one register into another, in some embodiments the restorescc instruction moves the conditions condition codes.

Figure 10:
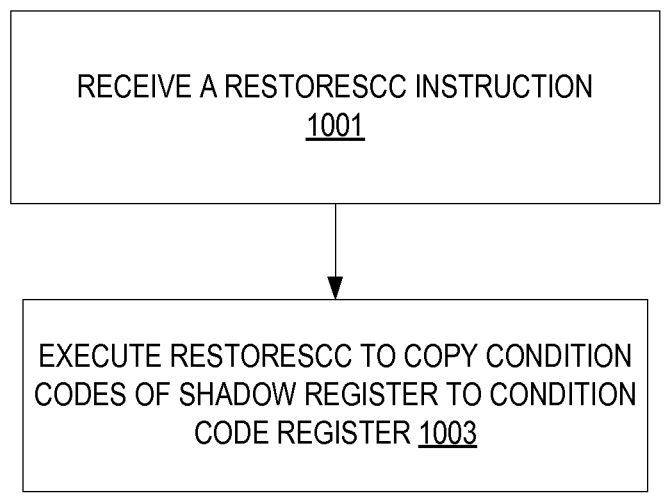
FIG. 10 illustrates an embodiment of a method of operation of the restorescc instruction.

FIG. 10 illustrates an embodiment of a method of operation of the restorescc instruction. At 1001, the restorescc instruction is received. In response to the received restorescc instruction, it is executed and the condition codes of the shadow register 202 are copied into the condition code register 201 at 1003. In some embodiments, the other flags of the condition code register 201 are unchanged. In other embodiments, the other flags of the condition code register 201 are changed.

Figure 11:
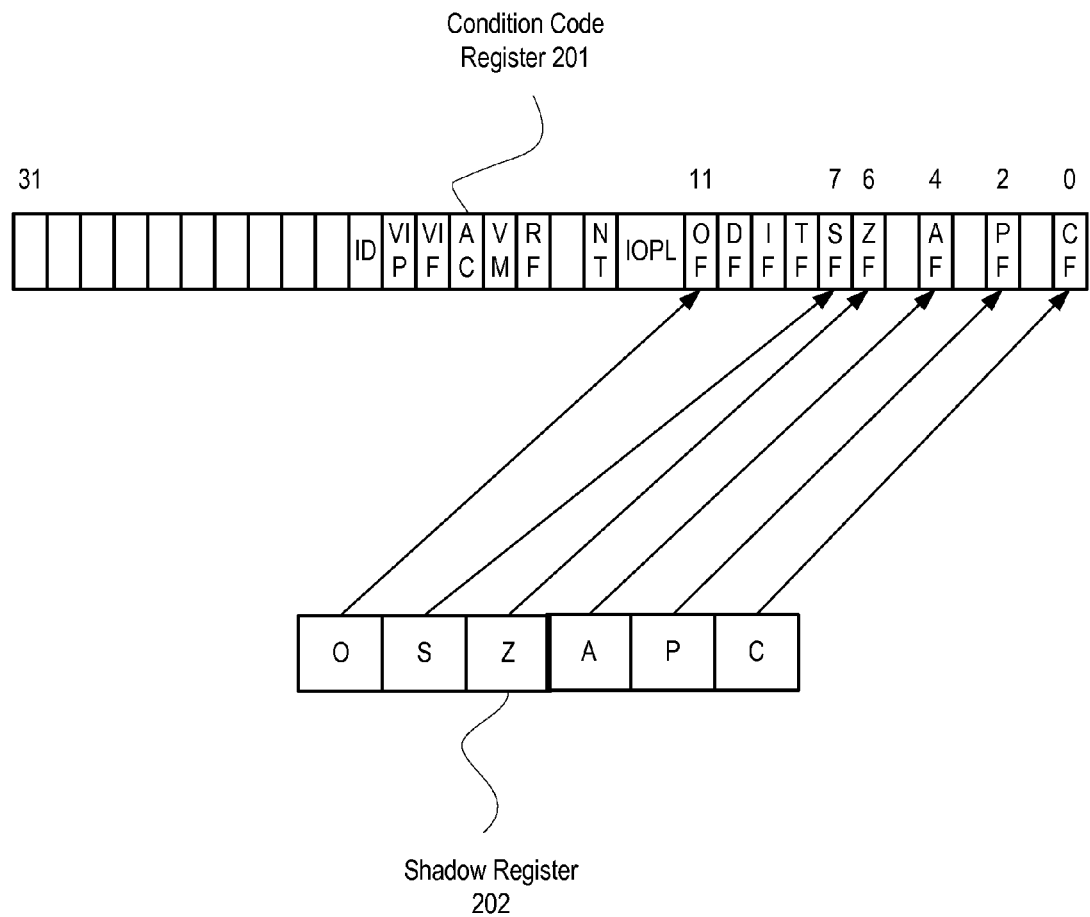
FIG. 11 illustrates an embodiment of a condition code register and a shadow register after the execution of a restorescc instruction.

FIG. 11 illustrates an embodiment of a condition code register and a shadow register after the execution of a restorescc instruction. The shadow register 202 of FIG. 11 is an EFLAGS register and has overflow, sign, zero, parity, and carry condition code bits at the marked positions. The condition code register 201 receives a copy of those condition codes (or at least a portion thereof) and stores them. While the shadow register 202 shows the arrangement of the condition codes in a particular order, any ordering is acceptable. Additionally, the shadow register can be any size including the five bits shown, eights, 16 bits, etc.

Figure 12:
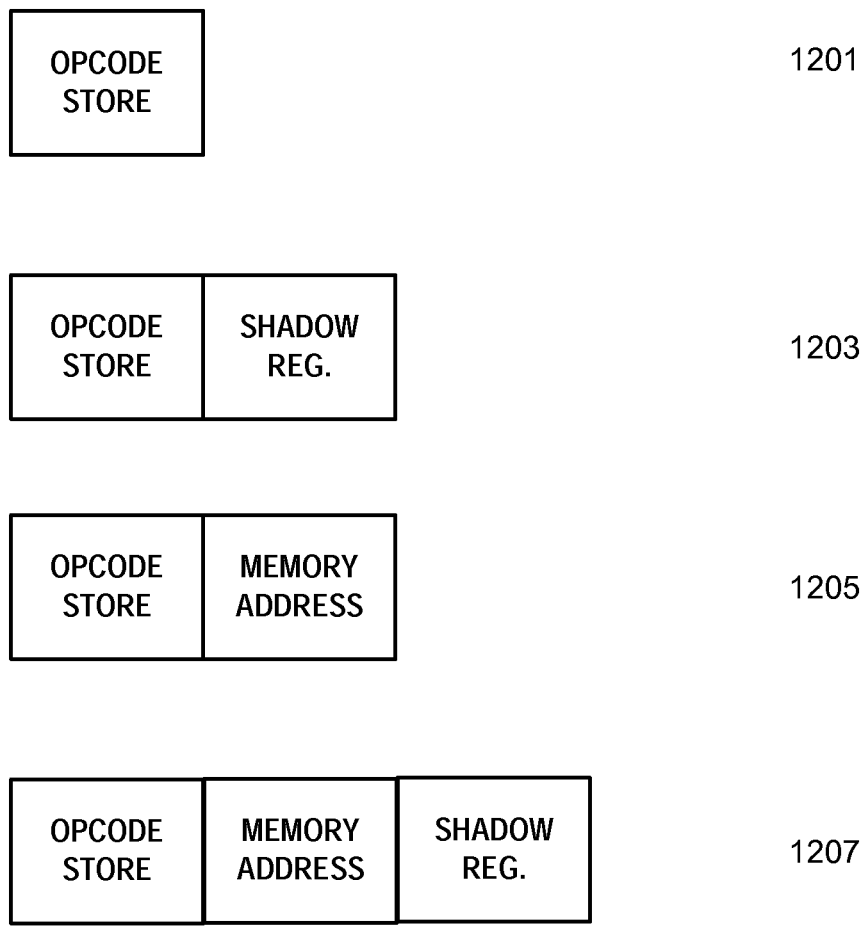
FIG. 12 illustrates exemplary embodiments of storescc instructions.

Exemplary embodiments of storescc instructions are shown in FIG. 12. In FIG. 12, the storescc instruction 1201 consists of an opcode and nothing else. In this embodiment the memory address and shadow register are implicit. In other embodiments, the storescc instruction 1203 also includes an explicit operand (such as an explicit register or immediate) of the shadow register. In other embodiments, the storescc instruction 1205 also includes an explicit operand (such as an explicit register or immediate) that provides a memory address. Additionally, in other embodiments, the storescc instruction 1207 also includes two explicit operands (such as an explicit register or immediate) of shadow register and a memory address. Of course, the size of the memory address is dependent on which memory is being access (RAM or non-volatile memory), but in an embodiment is 8-bits in size.

Figure 13:
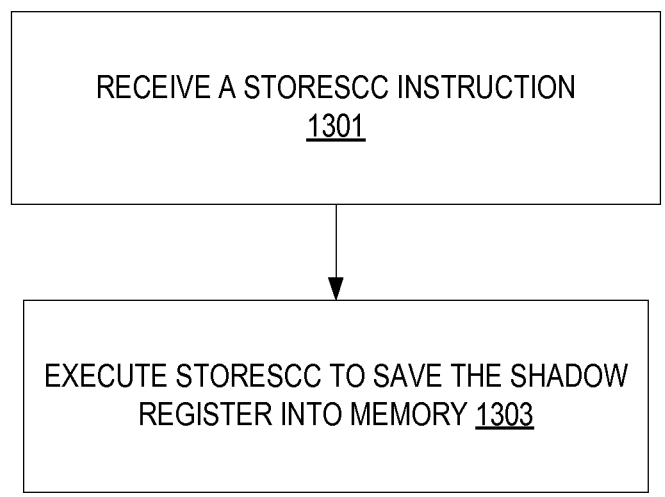
FIG. 13 illustrates an embodiment of a method of operation of the storescc instruction.

FIG. 13 illustrates an embodiment of a method of operation of the storescc instruction. At 1301, the storescc instruction is received. In response to the received storescc instruction, it is executed and the condition codes of the shadow register 202 are stored into memory at 1303.

Exemplary embodiments of loadscc instructions are shown in FIG. 14. In FIG. 14, the loadscc instruction 1401 consists of an opcode and nothing else. In this embodiment the memory addresses and shadow register are implicit. In other embodiments, the loadscc instruction 1403 also includes an explicit operand (such as an explicit register or immediate) of the shadow register. In other embodiments, the loadscc instruction 1405 also includes an explicit operand (such as an explicit register or immediate) that provides the address of a memory address. Additionally, in other embodiments, the loadscc instruction 1407 also includes two explicit operands (such as an explicit register or immediate) of the shadow register and a memory address. Of course, the size of the memory address is dependent on which memory is being access (RAM or non-volatile memory), but in an embodiment is 8-bits in size.

Figure 15:
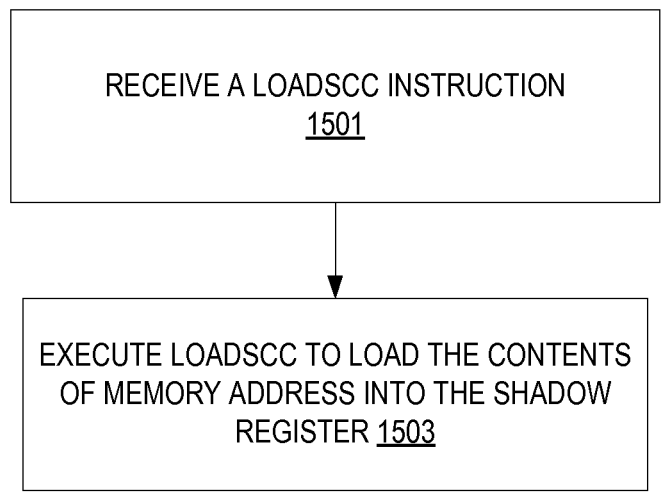
FIG. 15 illustrates an embodiment of a method of operation of the loadscc instruction.

FIG. 15 illustrates an embodiment of a method of operation of the loadscc instruction. At 1501, the loadscc instruction is received. In response to the received loadscc instruction, it is executed and the condition codes stored in memory are loaded to the shadow register 202 at 1503.

Figure 16:
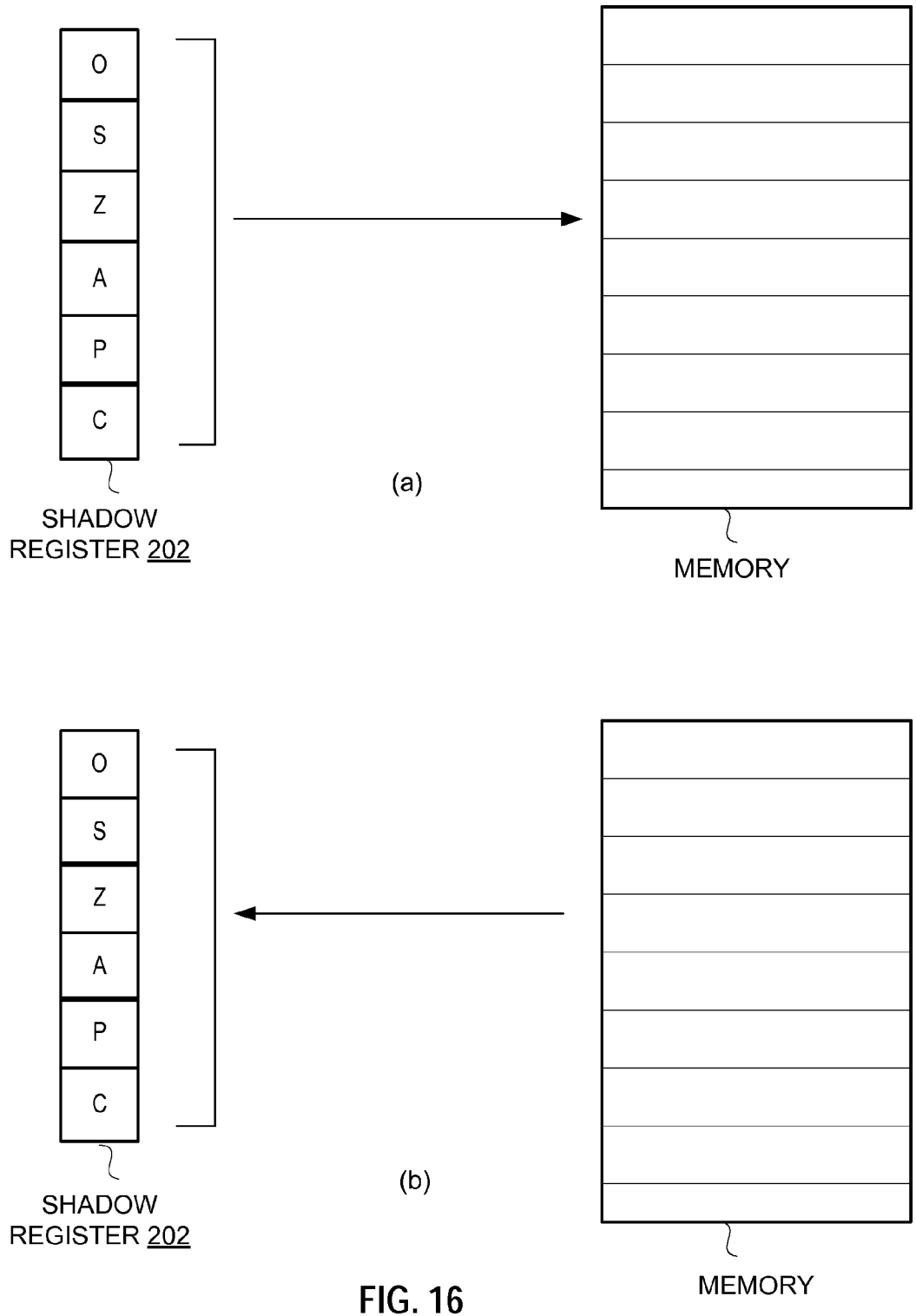
FIGS. 16(*a*) and (*b*) illustrate an embodiment of memory and a shadow register after the execution of a storescc and loadscc instruction respectively.

FIGS. 16(*a*) and (*b*) illustrate an embodiment of memory and a shadow register after the execution of a storescc and loadscc instruction respectively.

The architecture of FIG. 2 may also support one or more of the following instructions to support the saving or restoring of only the condition code flags in the condition code register to/from memory and directly jump based on the value of one or more of the flags in a memory location: 1) a storecc instruction to cause the contents of the condition code register's condition code flags (e.g., CF, PF, AF, ZF, SF, OF) to be stored at a memory address; 2) a loadcc M8 instruction to cause the contents of the condition code register's condition code flags (e.g., CF, PF, AF, ZF, SF, OF) to be loaded from a memory address while leaving the values of other flags in condition code register unchanged; and 3) jCC.m instructions that test the flags in an addressed memory location to conditionally jump.

Exemplary embodiments of storecc instructions are shown in FIG. 17. In FIG. 17, the storecc instruction 1701 consists of an opcode and nothing else. In this embodiment the memory address and condition code register are implicit. In other embodiments, the storecc instruction 1703 also includes an explicit operand (such as an explicit register or immediate) of the condition code register. In other embodiments, the storecc instruction 1705 also includes an explicit operand (such as an explicit register or immediate) that provides the address of a memory address. Additionally, in other embodiments, the storecc instruction 1707 also includes two explicit operands (such as an explicit register or immediate) of the condition code register and a memory address. Of course, the size of the memory address is dependent on which memory is being access (RAM or non-volatile memory), but in an embodiment is 8-bits in size.

Figure 18:
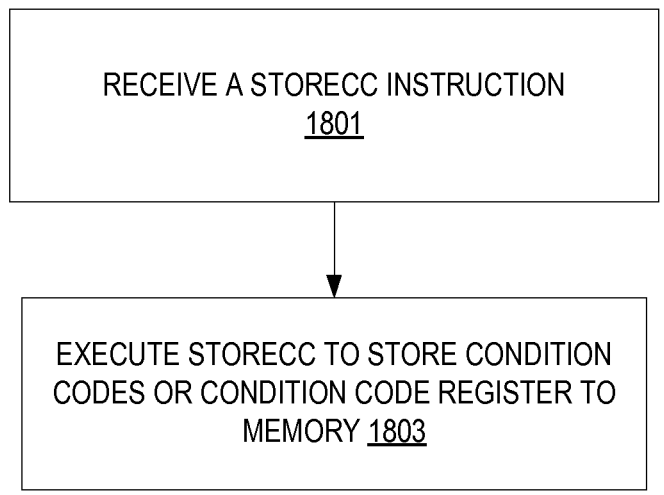
FIG. 18 illustrates an embodiment of a method of operation of the storecc instruction.

FIG. 18 illustrates an embodiment of a method of operation of the storecc instruction. At 1801, the storecc instruction is received. In response to the received storecc instruction, it is executed and the condition codes of the condition code register 201 are stored into memory at 1803.

Exemplary embodiments of loadcc instructions are shown in FIG. 19. In FIG. 19, the loadcc instruction 1901 consists of an opcode and nothing else. In this embodiment the memory addresses and shadow register are implicit. In other embodiments, the loadcc instruction 1903 also includes an explicit operand (such as an explicit register or immediate) of the condition code register. In other embodiments, the loadcc instruction 1905 also includes an explicit operand (such as an explicit register or immediate) that provides the address of a memory address. Additionally, in other embodiments, the loadcc instruction 1907 also includes two explicit operands (such as an explicit register or immediate) of the condition code register and a memory address. Of course, the size of the memory address is dependent on which memory is being access (RAM or non-volatile memory), but in an embodiment is 8-bits in size.

Figure 20:
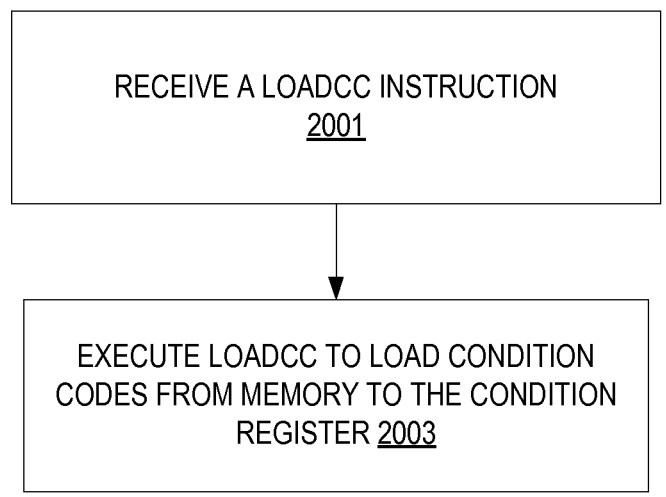
FIG. 20 illustrates an embodiment of a method of operation of a loadcc instruction.

FIG. 20 illustrates an embodiment of a method of operation of the loadcc instruction. At 2001, the loadcc instruction is received. In response to the received loadcc instruction, it is executed and the condition codes stored in memory are loaded to the condition code register 201 at 2003.

Figure 21:
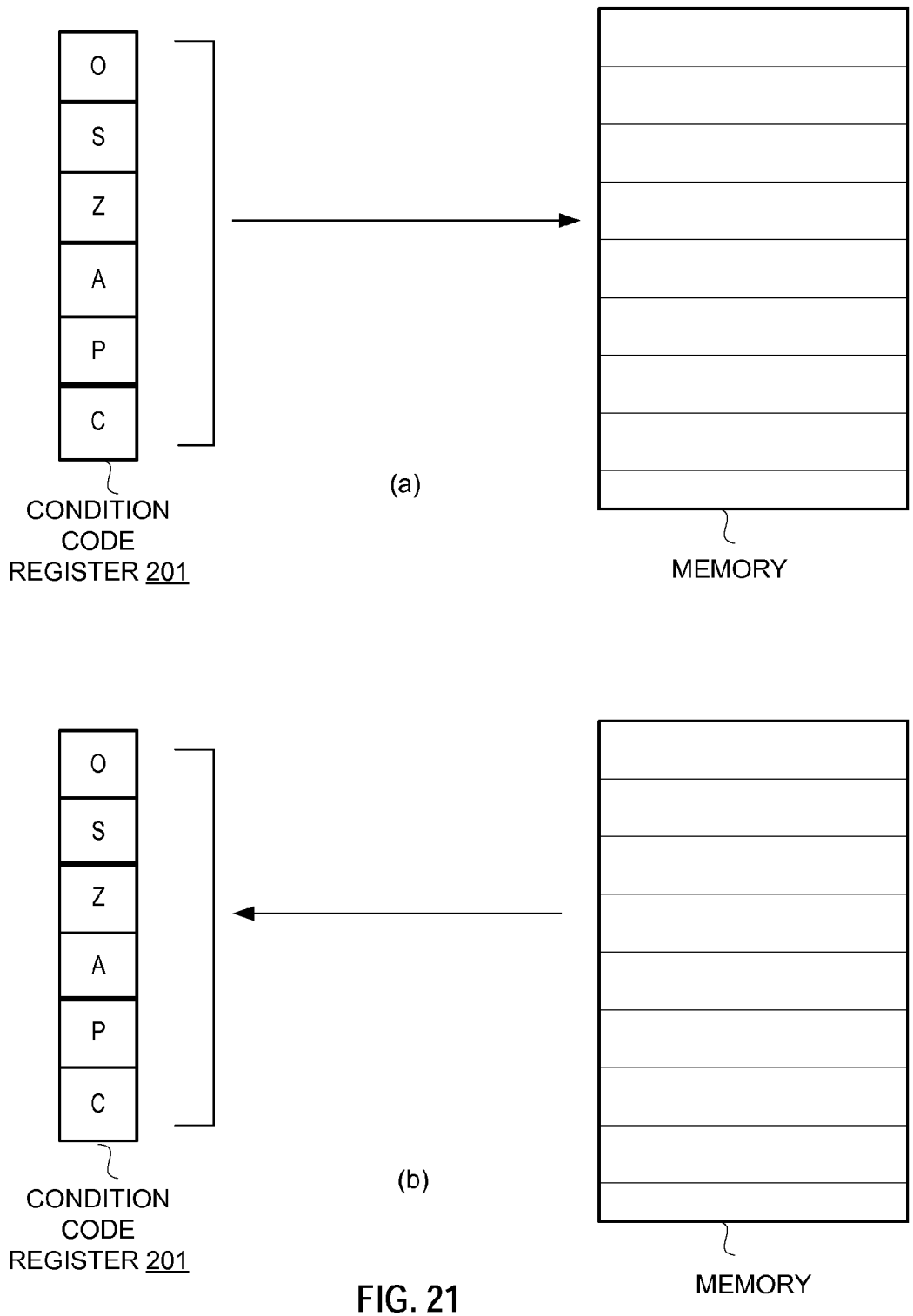
FIG. 21 illustrates an embodiment of a condition code register and memory after the execution of a storecc and loadcc instruction respectively.

FIGS. 21(*a*) and (*b*) illustrate an embodiment of a condition code register and memory after the execution of a storecc and loadcc instruction respectively.

FIG. 22 illustrates some exemplary jcc.m type instructions. The jcc.m type instruction conditionally jumps based on one or more values condition code values in memory. The execution of this instruction checks the state of one or more of the status flags in memory and, if the flags are in the specified state (condition), performs a jump to the target instruction specified by the destination operand. A condition code (cc) is associated with each instruction to indicate the condition being tested for. If the condition is not satisfied, the jump is not performed and execution continues with the instruction following the jcc.scc instruction.

Each jcc.m type instruction includes a specified relative offset (a signed offset relative to the current value of the instruction pointer). A relative offset (rel8, rel16, or rel32) is generally specified as a label in assembly code, but at the machine code level, it is encoded as a signed, 8-bit or 32-bit immediate value, which is added to the instruction pointer.

The conditions for each jcc.m mnemonic are given in the "Description" column of FIG. 6. The terms "less" and "greater" are used for comparisons of signed integers and the terms "above" and "below" are used for unsigned integers. Additionally, in some embodiments the jcc.m type instructions include an address M. In some embodiments, the address M is 8 bits in length. However, the address does not need to be that size. Additionally, the address may be explicit or implicit to the instruction.

Figure 23:
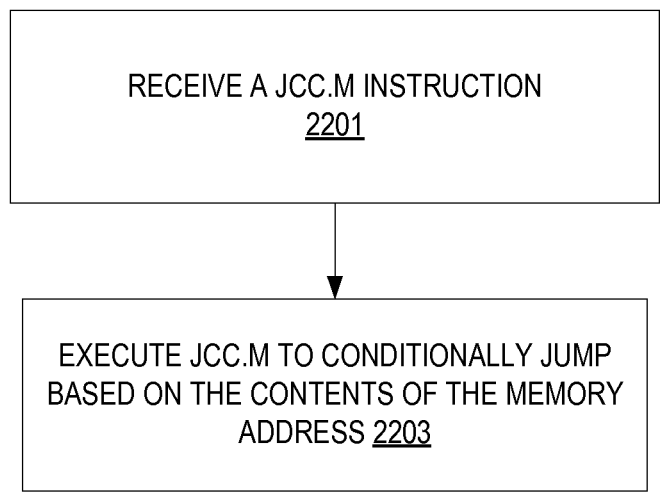
FIG. 23 illustrates an embodiment of a method of operation of a jcc.m type instruction.

FIG. 23 illustrates an embodiment of a method of operation of a jcc.m type instruction. At 2301, the jcc.m instruction is received. In response to the received jcc.m instruction, it is executed and a conditional jump is made based on the condition code stored in memory indicated by the jcc.m instruction at 2301. If the condition is not valid, then the next instruction is executed.

The use of the above load and store instructions may be used for context or thread switching.

Figure 24:
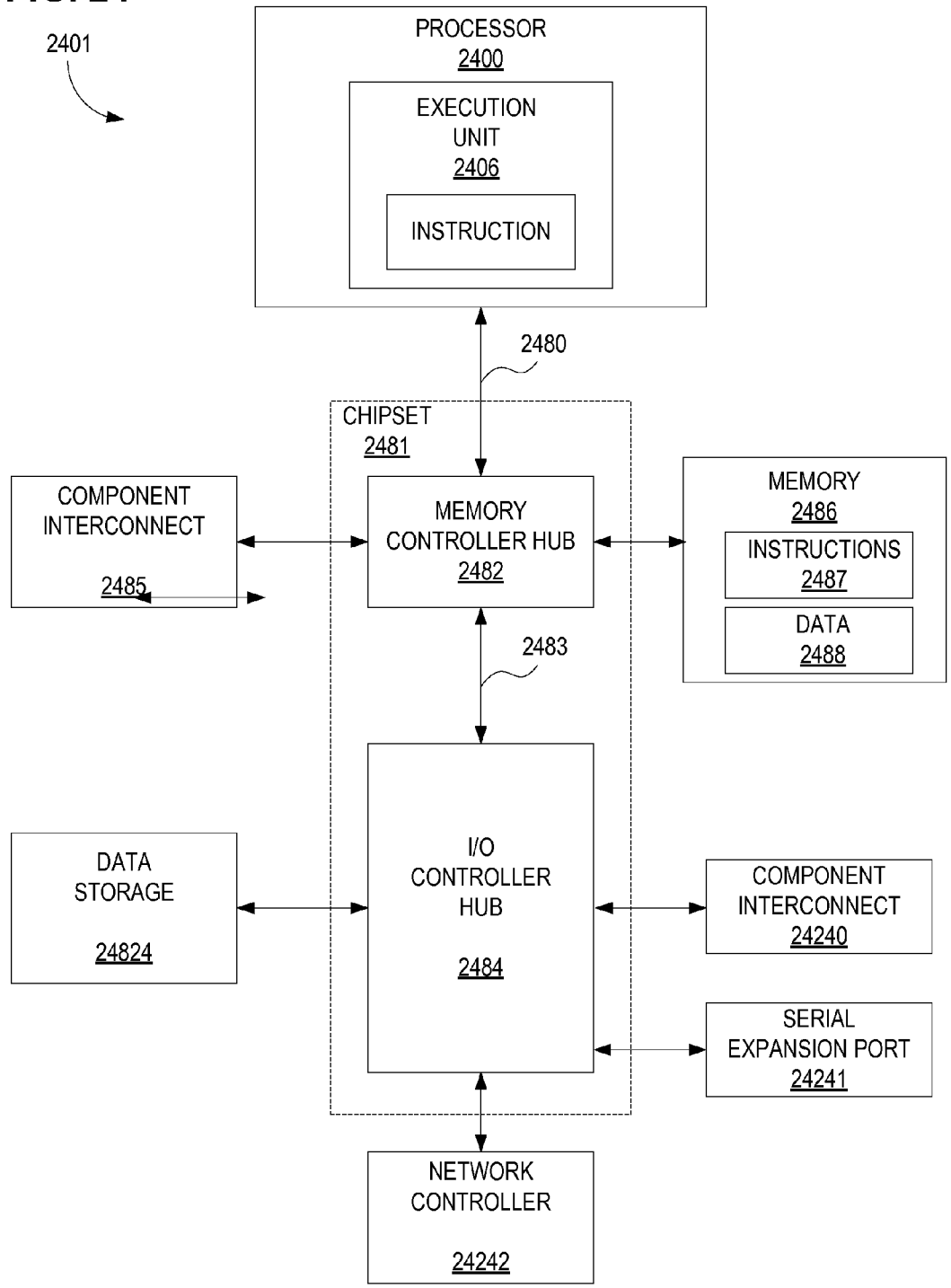
FIG. 24 illustrates a block diagram of an example embodiment of a suitable computer system.

FIG. 24 is a block diagram of an example embodiment of a suitable computer system 2401. The computer system includes a processor 2400. The processor includes at least one execution unit 2406 that is capable of executing at least one of the above described instructions 2402.

The processor is coupled to a chipset 2481 via a bus (e.g., a front side bus) or other interconnect 2480. The interconnect may be used to transmit data signals between the processor and other components in the system via the chipset.

The chipset includes a system logic chip known as a memory controller hub (MCH) 982. The MCH is coupled to the front side bus or other interconnect 2480.

A memory 2486 is coupled to the MCH. In various embodiments, the memory may include a random access memory (RAM). DRAM is an example of a type of RAM used in some but not all computer systems. As shown, the memory may be used to store instructions 987, such as one or more multiply instructions, and data 2488.

A component interconnect 2485 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 2484. The ICH is coupled to the MCH through hub interface bus or other interconnect 2483. In one or more embodiments, the bus or other interconnect 2483 may include a Direct Media Interface (DMI).

A data storage 2489 is coupled to the ICH. In various embodiments, the data storage may include a hard disk drive, a floppy disk drive, a CD-ROM device, a flash memory device, or the like, or a combination thereof.

A second component interconnect 2490 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 2491 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 2482 may be physically integrated on-die with the processor 900 and the processor may be directly coupled with a memory 2486 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 25:
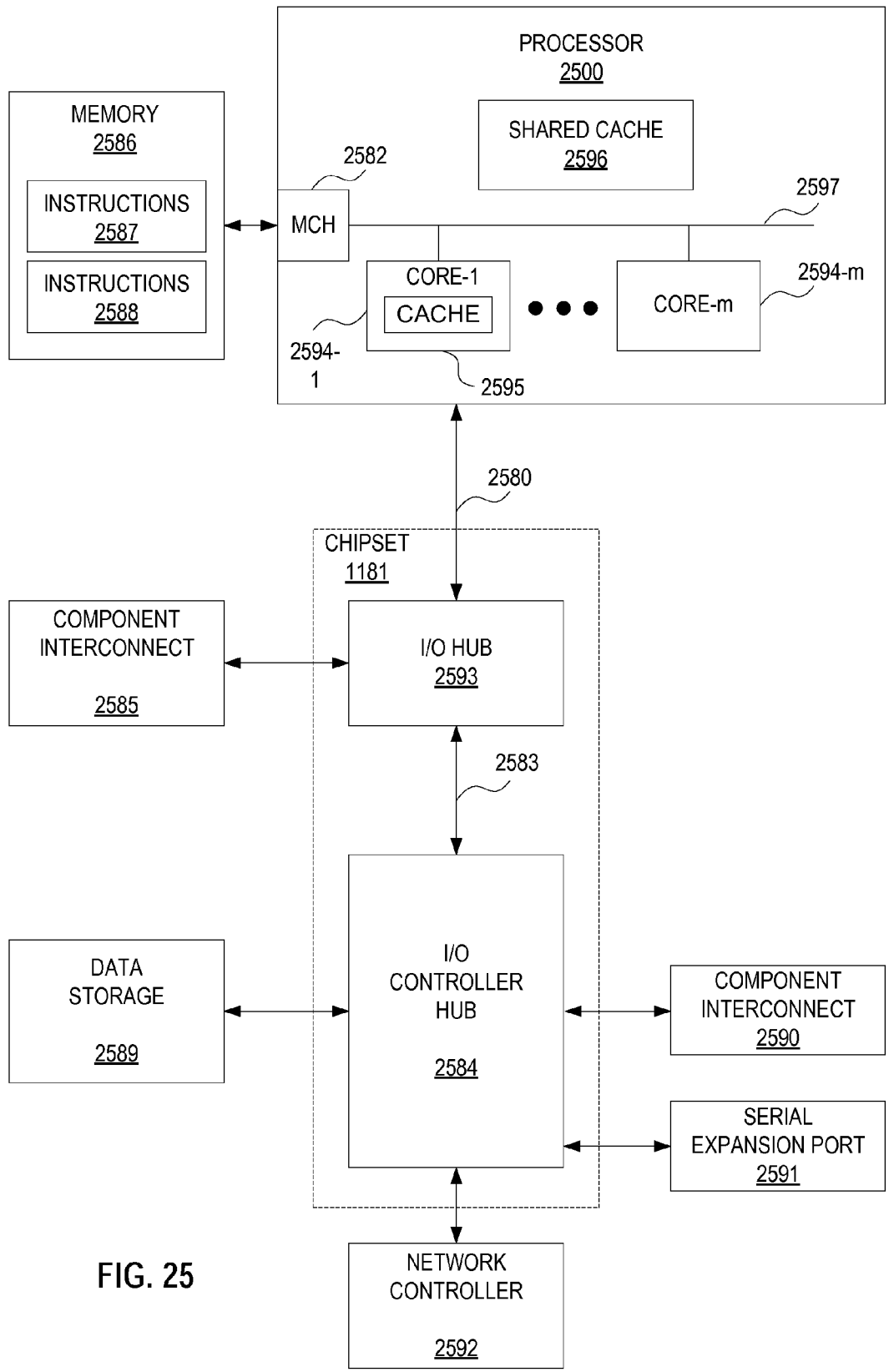
FIG. 25 illustrates a block diagram of an example embodiment of a suitable computer system.

FIG. 25 is a block diagram of an example embodiment of a suitable computer system 1001. The second example embodiment has certain similarities to the first example computer system described immediate above. For clarity, the discussion will tend to emphasize the differences without repeating all of the similarities.

Similar to the first example embodiment described above, the computer system includes a processor 2500, and a chipset 2581 having an I/O controller hub (ICH) 2584. Also similarly to the first example embodiment, the computer system includes a first component interconnect 2585 coupled with the chipset, a second component interconnect 2590 coupled with the ICH, a serial expansion port 2591 coupled with the ICH, a network controller 2592 coupled with the ICH, and a data storage 2589 coupled with the ICH.

In this second embodiment, the processor 2500 is a multi-core processor. The multi-core processor includes processor cores 2594-1 through 25594-M, where M may be an integer number equal to or larger than two (e.g. two, four, seven, or more). Each core may include at least one execution unit that is capable of executing at least one embodiment of an instruction as disclosed herein. As shown, the core-1 includes a cache 2595 (e.g., an L1 cache). Each of the other cores may similarly include a dedicated cache. The processor cores may be implemented on a single integrated circuit (IC) chip.

The processor also includes at least one shared cache 2596. The shared cache may store data (e.g., instructions) that are utilized by one or more components of the processor, such as the cores. For example, the shared cache may locally cache data stored in a memory 2586 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 2597. The bus or other interconnect may couple the cores and the shared cache and allow communication.

The processor also includes a memory controller hub (MCH) 2582. As shown in this example embodiment, the MCH is integrated with the processor 2500. For example, the MCH may be on-die with the processor cores. The processor is coupled with the memory 2586 through the MCH. In one or more embodiments, the memory may include DRAM, although this is not required.

The chipset includes an input/output (I/O) hub 2593. The I/O hub is coupled with the processor through a bus (e.g., a QuickPath Interconnect (QPI)) or other interconnect 2580. The first component interconnect 2585 is coupled with the I/O hub 2593.

Figure 26:
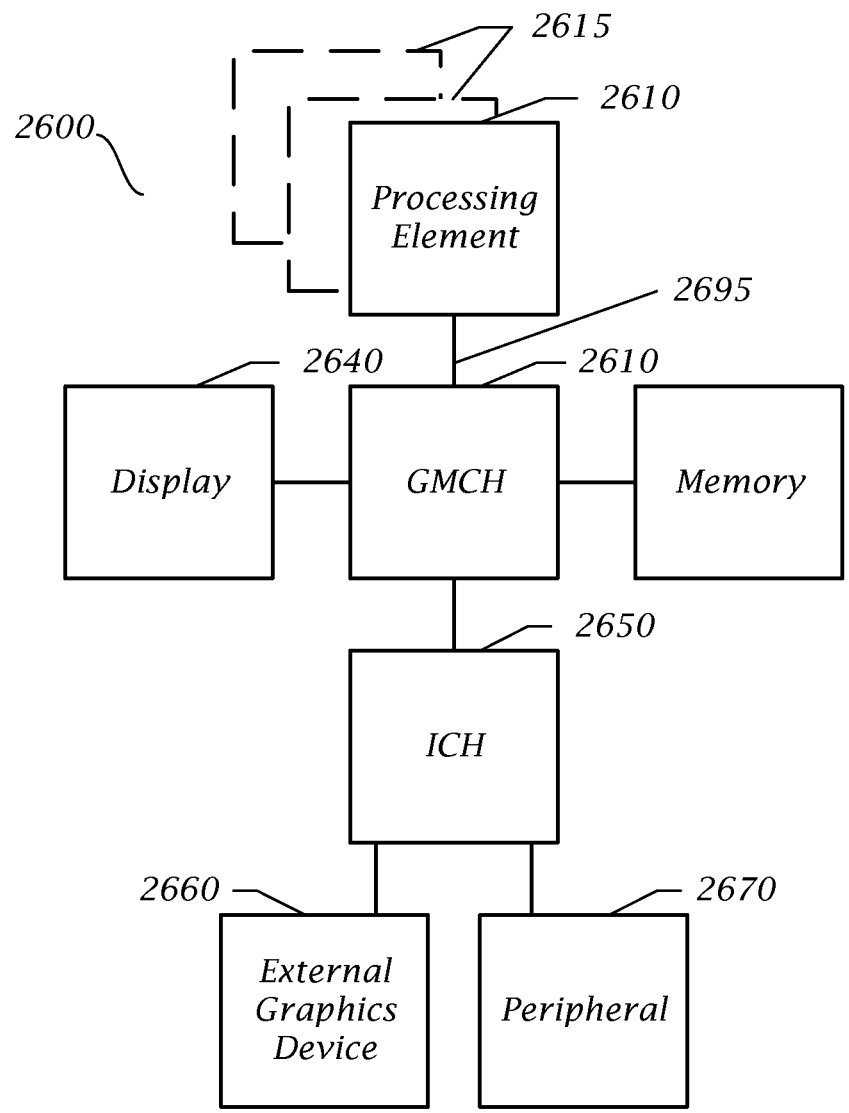
FIG. 26 illustrates is a block diagram of a system in accordance with one embodiment of the present invention.

Referring now to FIG. 26, shown is a block diagram of a system in accordance with one embodiment of the present invention. The system 2600 may include one or more processing elements 2610, 2615, which are coupled to graphics memory controller hub (GMCH) 2620. The optional nature of additional processing elements 2615 is denoted in FIG. 26 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 26 illustrates that the GMCH 2620 may be coupled to a memory 2640 that may be, for example, a dynamic random access memory (DRAM). The DRAM may, for at least one embodiment, be associated with a non-volatile cache.

The GMCH 2620 may be a chipset, or a portion of a chipset. The GMCH 2620 may communicate with the processor(s) 2610, 2615 and control interaction between the processor(s) 2610, 2615 and memory 2640. The GMCH 2620 may also act as an accelerated bus interface between the processor(s) 2610, 2615 and other elements of the system 2600. For at least one embodiment, the GMCH 2620 communicates with the processor(s) 2610, 2615 via a multi-drop bus, such as a frontside bus (FSB) 2695.

Furthermore, GMCH 1120 is coupled to a display 2640 (such as a flat panel display). GMCH 2620 may include an integrated graphics accelerator. GMCH 2620 is further coupled to an input/output (I/O) controller hub (ICH) 2650, which may be used to couple various peripheral devices to system 2600. Shown for example in the embodiment of FIG. 26 is an external graphics device 2660, which may be a discrete graphics device coupled to ICH 2650, along with another peripheral device 2670.

Alternatively, additional or different processing elements may also be present in the system 1100. For example, additional processing element(s) 2615 may include additional processors(s) that are the same as processor 2610, additional processor(s) that are heterogeneous or asymmetric to processor 2610, accelerators (such as, e.g., graphics accelerators or digital signal processing (DSP) units), field programmable gate arrays, or any other processing element. There can be a variety of differences between the physical resources 2610, 2615 in terms of a spectrum of metrics of merit including architectural, microarchitectural, thermal, power consumption characteristics, and the like. These differences may effectively manifest themselves as asymmetry and heterogeneity amongst the processing elements, 2615. For at least one embodiment, the various processing elements 2610, 2615 may reside in the same die package.

Figure 27:
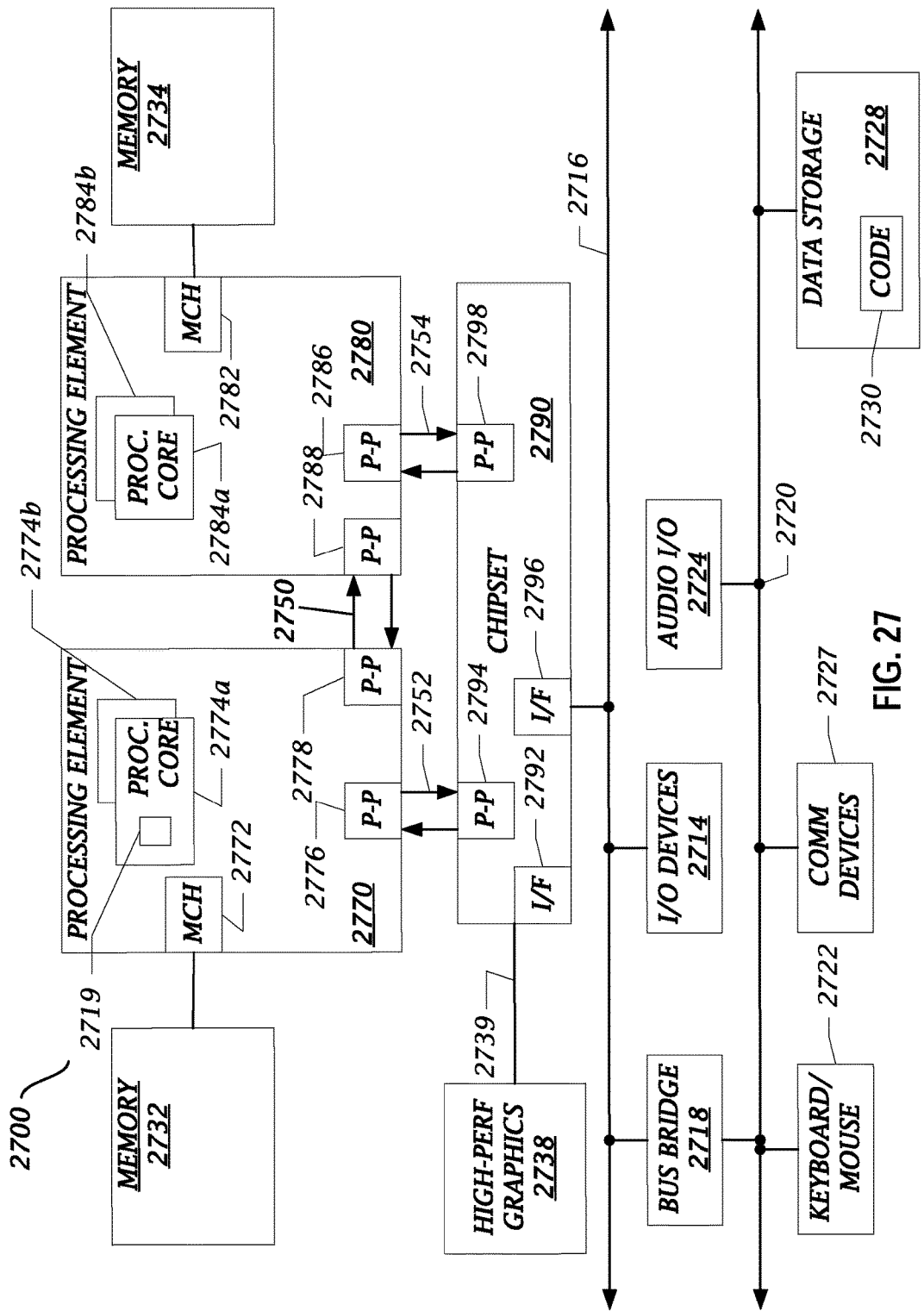
FIG. 27 illustrates is a block diagram of a system in accordance with one embodiment of the present invention.

Referring now to FIG. 27, shown is a block diagram of a second system 2700 in accordance with an embodiment of the present invention. As shown in FIG. 12, multiprocessor system 2700 is a point-to-point interconnect system, and includes a first processing element 2770 and a second processing element 2780 coupled via a point-to-point interconnect 1250. As shown in FIG. 27, each of processing elements 2770 and 2780 may be multicore processors, including first and second processor cores (i.e., processor cores 2774*a* and 2774*b* and processor cores 2784*a* and 2784*b*).

Alternatively, one or more of processing elements 2770, 2780 may be an element other than a processor, such as an accelerator or a field programmable gate array.

While shown with only two processing elements 2770, 2780, it is to be understood that the scope of the present invention is not so limited. In other embodiments, one or more additional processing elements may be present in a given processor.

First processing element 2770 may further include a memory controller hub (MCH) 2772 and point-to-point (P-P) interfaces 2776 and 2778. Similarly, second processing element 2780 may include a MCH 2782 and P-P interfaces 2786 and 2788. Processors 2770, 2780 may exchange data via a point-to-point (PtP) interface 1250 using PtP interface circuits 2778, 2788. As shown in FIG. 27, MCH's 2772 and 2782 couple the processors to respective memories, namely a memory 2742 and a memory 2744, which may be portions of main memory locally attached to the respective processors.

Processors 2770, 2780 may each exchange data with a chipset 2790 via individual PtP interfaces 2752, 2754 using point to point interface circuits 2776, 2794, 2786, 2798. Chipset 2790 may also exchange data with a high-performance graphics circuit 2738 via a high-performance graphics interface 2739. Embodiments of the invention may be located within any processor having any number of processing cores, or within each of the PtP bus agents of FIG. 27. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 2770 and second processing element 2780 may be coupled to a chipset 2790 via P-P interconnects 2776, 2786 and 2784, respectively. As shown in FIG. 27, chipset 2790 includes P-P interfaces 2794 and 2798. Furthermore, chipset 1290 includes an interface 2792 to couple chipset 2790 with a high performance graphics engine 2748. In one embodiment, bus 2749 may be used to couple graphics engine 2748 to chipset 2790. Alternately, a point-to-point interconnect 2749 may couple these components.

In turn, chipset 2790 may be coupled to a first bus 2716 via an interface 2796. In one embodiment, first bus 2716 may be a Peripheral Component Interconnect (PCI) bus, or a bus such as a PCI Express bus or another third generation I/O interconnect bus, although the scope of the present invention is not so limited.

As shown in FIG. 27, various I/O devices 2714 may be coupled to first bus 2716, along with a bus bridge 2718 which couples first bus 2716 to a second bus 2720. In one embodiment, second bus 2720 may be a low pin count (LPC) bus. Various devices may be coupled to second bus 2720 including, for example, a keyboard/mouse 2722, communication devices 2726 and a data storage unit 2728 such as a disk drive or other mass storage device which may include code 2730, in one embodiment. Further, an audio I/O 2724 may be coupled to second bus 2720. Note that other architectures are possible. For example, instead of the point-to-point architecture of FIG. 27, a system may implement a multi-drop bus or other such architecture.

Figure 28:
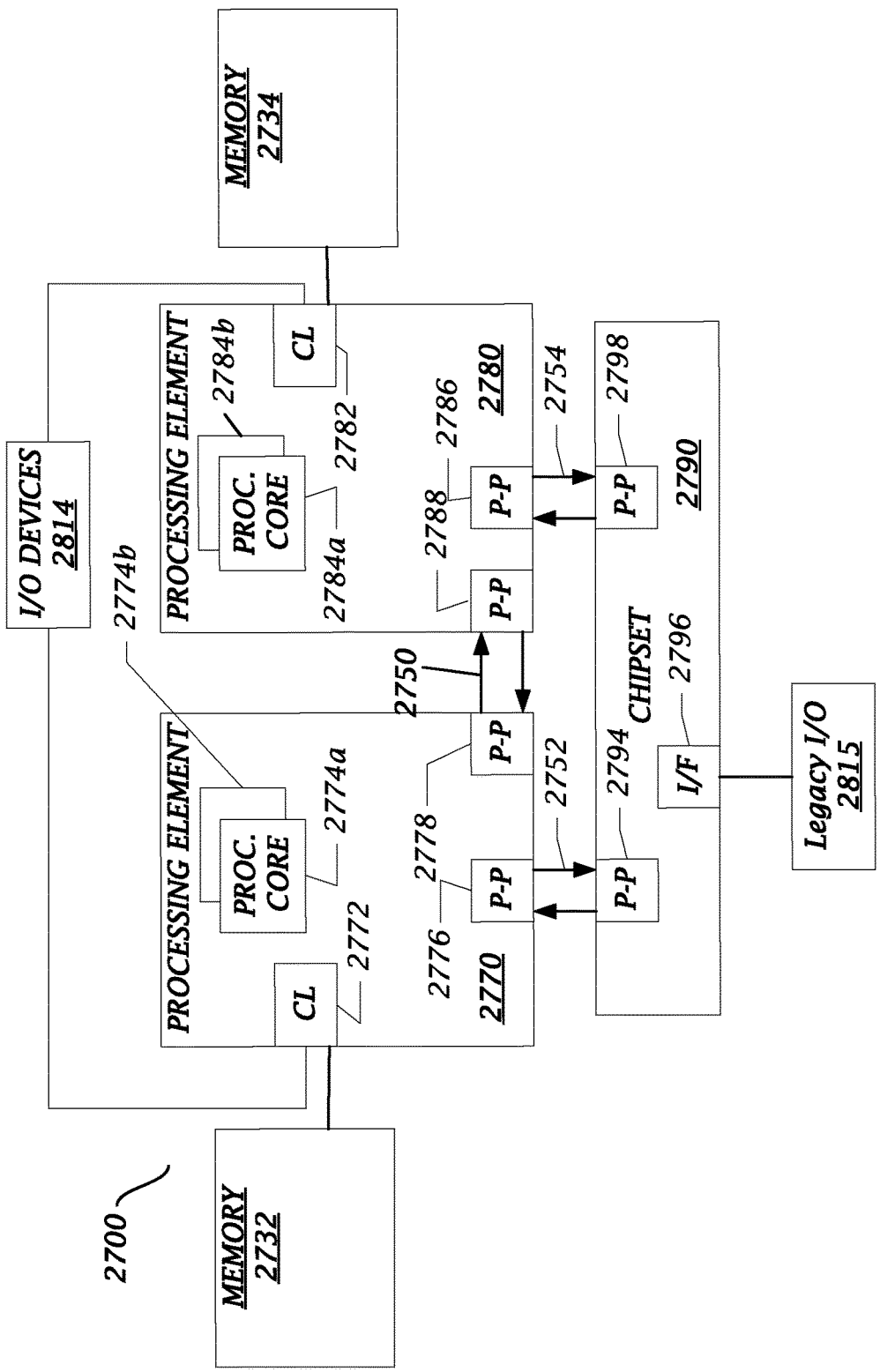
FIG. 28 illustrates is a block diagram of a system in accordance with one embodiment of the present invention.

Referring now to FIG. 28, shown is a block diagram of a third system 2800 in accordance with an embodiment of the present invention. Like elements in FIGS. 27 and 28 bear like reference numerals, and certain aspects of FIG. 27 have been omitted from FIG. 28 in order to avoid obscuring other aspects of FIG. 28.

FIG. 28 illustrates that the processing elements 2770, 2780 may include integrated memory and I/O control logic ("CL") 2772 and 2782, respectively. For at least one embodiment, the CL 2772, 2782 may include memory controller hub logic (MCH) such as that described above in connection with FIGS. 26 and 27. In addition. CL 2772, 2782 may also include I/O control logic. FIG. 28 illustrates that not only are the memories 2742, 2744 coupled to the CL 2772, 2782, but also that I/O devices 2814 are also coupled to the control logic 2772, 2782. Legacy I/O devices 2815 are coupled to the chipset 2790.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 2730 illustrated in FIG. 27, may be applied to input data to perform the functions described herein and generate output information. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. An apparatus, comprising:
    decode circuitry to decode a first instruction, wherein the first instruction to indicate that a plurality of unmodified condition codes bits are to be copied, and only the condition code bits are to be copied, from a first register to a second register, wherein the first register is a flags register that is to store information in addition to the plurality of condition code bits, and the second register is an only explicit operand of the first instruction; and
    first execution circuitry to copy only the plurality of unmodified condition code bits from the first register to the second register identified by the first instruction, wherein the second register to maintain a shadow copy of the plurality of unmodified condition code bits after the contents of the first register have changed.

2. The apparatus of claim 1, wherein the decode circuitry is further to decode a second instruction, wherein the second instruction indicates that a conditional jump is to be executed based on the condition code bits stored in the second register, and further comprising second execution circuitry to execute the second instruction.

3. The method of claim 1 wherein said first execution circuitry resides within any of:
- a branch execution unit;
- an arithmetic execution unit; and
- a memory access execution unit.

4. The method of claim 2 wherein said second instruction execution circuitry resides within a branch execution unit.

5. The apparatus of claim 2 wherein said first instruction execution circuitry is coupled to both said first register and a second register.

6. The apparatus of claim 5 wherein said second instruction execution circuitry is coupled to said second register.

7. The apparatus of claim 2 wherein said second instruction execution circuitry is coupled to the second register that stores said copied condition code information.

8. A method, comprising:
receiving a first instruction, wherein the first instruction indicates that a plurality of condition codes bits are to be copied, and only the condition code bits are to be copied, from a first register to a second register, wherein the first register is a flags register that is to store information in addition to the plurality of condition code bits, and the second register is an only explicit operand of the first instruction; and
in response to the first instruction, copying only the plurality of condition code bits from the first register to the second register identified by the first instruction, wherein the second register maintains a shadow copy of the plurality of condition code bits after the contents of the first register have changed.

9. The method of claim 8, further comprising:
receiving a second instruction, wherein the second instruction indicates that a conditional jump is to be executed based on at least one condition code bit in the second register; and
in response to the first instruction, conditionally jumping to a location based on the at least one condition code bit in the second register.

10. The method of claim 9 wherein said second instruction is any of:
a jump short instruction; and
a jump near instruction.

11. The method of claim 8 wherein said second instruction reads said at least one condition code bit from said second register.

12. The method of claim 8 wherein said condition code bits includes any of:
zero,
carry,
sign,
overflow, and
parity.

13. The method of claim 8 wherein said first register is a condition code register.

14. A computing system, comprising
a color display; and
a processor to execute instructions, said processor having:
decode circuitry to decode a first instruction, wherein the first instruction to indicate that a plurality of condition codes bits are to be copied, and only the condition code bits are to be copied, from a first register to a second register, wherein the first register is a flags register that is to store information in addition to the plurality of condition code bits, and the second register is an only explicit operand of the first instruction; and
first execution circuitry to copy only the plurality of condition code bits from the first register to the second register identified by the first instruction, wherein the second register to maintain a shadow copy of the plurality of condition code bits after the contents of the first register have changed.

15. The system of claim 14, wherein the decode circuitry is further to decode a second instruction, wherein the second instruction indicates that a conditional jump is to be executed based on the condition code bits stored in the second register, and further comprising second execution circuitry to execute the second instruction.

16. The system of claim 14, wherein said first execution circuitry resides within any of:
a branch execution unit;
an arithmetic execution unit; and
a memory access execution unit.

17. The system of claim 14 wherein said condition bits includes any of:
zero,
carry,
sign,
overflow, and
parity.

* * * * *